United States Patent [19]

Orthwein

[11] Patent Number: 4,881,604
[45] Date of Patent: Nov. 21, 1989

[54] COMPUTER AIDED ANTI-BUCKLING DEVICE FOR MINE ROOF BOLTING MACHINES

[76] Inventor: William C. Orthwein, P.O. Box 3332, Carbondale, Ill. 62902

[21] Appl. No.: 41,010
[22] Filed: Apr. 21, 1987
[51] Int. Cl.⁴ .......................... B23Q 15/00; F21C 5/16
[52] U.S. Cl. ................................. 173/11; 173/38; 173/160; 408/6; 408/11
[58] Field of Search .................... 173/1, 4, 11, 38, 160; 367/96, 99; 408/6, 11

[56] References Cited

U.S. PATENT DOCUMENTS

| | | | |
|---|---|---|---|
| 2,320,874 | 6/1943 | Livingston et al. | 173/4 |
| 2,322,741 | 6/1943 | Osgood | 173/4 |
| 4,327,427 | 4/1982 | Hotta et al. | 367/96 |
| 4,328,872 | 5/1982 | Orthwein | 173/160 |
| 4,371,040 | 2/1983 | Orthwein | 173/11 |
| 4,478,290 | 10/1984 | Orthwein | 173/11 |
| 4,534,420 | 8/1985 | Goldelius | 173/1 |

Primary Examiner—Frank T. Yost
Assistant Examiner—James L. Wolfe
Attorney, Agent, or Firm—Foley & Lardner, Schwartz, Jeffery, Schwaab, Mack, Blumenthal & Evans

[57] ABSTRACT

The apparatus comprises a mine shaft roof bolting machine for drilling holes in a mine shaft roof in combination with an apparatus for controlling the thrust applied to the drill rod, commonly known as a pinning rod, to ensure that a buckling failure of the pinning rod will not occur. The thrust is controlled by a computer in conjunction with a solenoid controlled relief valve which is actuated by commands from the computer. The computer determines the length of the pinning rod exposed below the mine shaft roof from data received from one or more of the following sensors: an electronic device for measuring hydraulic cylinder rod extension, contact switches, rotary encoders, proximity switches, and ultrasonic transceivers and associated circuitry. From these data it calculates the maximum thrust which can be applied to the pinning rod without causing a buckling failure of the pinning rod and controls the maximum thrust delivered to the rod through the computer actuated pressure control valve to maintain the thrust at or below the maximum thrust. As a backup safety device the apparatus also includes provisions to use data read by the computer from load cells or strain gages attached to the torque motor, its housing, or other support means, to detect the moment applied to the motor shaft whenever the pinning rod begins to bend at the onset of buckling.

24 Claims, 23 Drawing Sheets

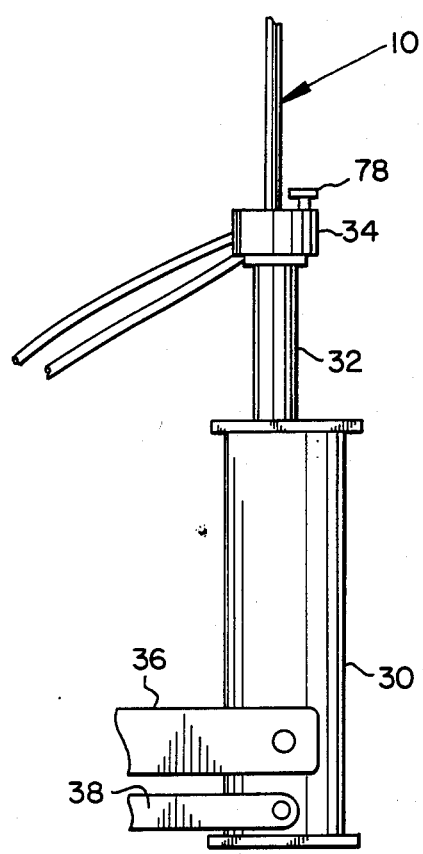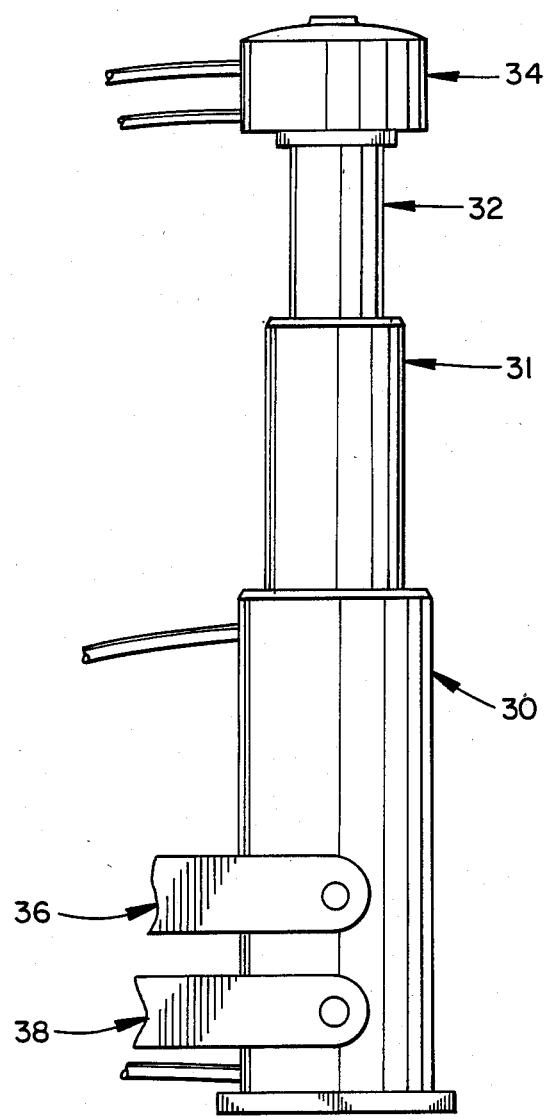
FIG. 2
FIG. 3

COMPUTER AIDED ANTI-BUCKLING DEVICE FOR MINE ROOF BOLTING MACHINES

BACKGROUND OF THE INVENTION

1. Field of the Invention

The present invention relates to safety apparatus for preventing buckling of pinning rods used with underground mine shaft roof bolting machines.

2. Discussion of Related Art

In U.S. mining practice, passages of rectangular cross-sections are constructed in underground mines. These passages induce failure of the rock near the center of the passage. Mine regulations therefore require the mining company to insert bolts ranging in length from 2 to 8 feet in the mine roof at regular intervals to keep the rock in place. These bolts are installed by a machine which uses a bit and a long extension shank, often called a pinning rod, to first drill a hole in the roof and then to insert a long bolt with an expansion anchor on the upper end. Buckling of the pinning rods during the pinning operation is common because the bolting machines can exert enough thrust to easily bend the pinning rod as it begins to drill into the mine roof. Although the insertion thrust may be manually controlled by the operator, bolting machines have proven to be dangerous and, in numerous cases, machine operators have been seriously injured or even killed when the pinning rods have buckled.

The roof bolting machines are typically hydraulically operated and comprise a torque motor, a pinning rod held for rotation by the torque motor, a hydraulic device for exerting upward thrust on the torque motor to force the pinning rod upwardly into the mine roof, and a device for manually controlling the upward thrust. Many of the roof bolters which are now commercially available have a hydraulically operated boom for raising the torque motor. The boom includes a linkage arrangement for maintaining the pinning rod in a vertical position.

Devices have been suggested for hydraulically controlling the rate of pinning rod infeed so as to increase the drilling rate for softer rock and decrease the drilling rate for hard spots. For example, U.S. Pat. No. 2,320,874 to Lehmann controls the infeed rate and includes a threshold level pressure cutoff which stops the infeed when the pressure in the feed cylinders builds up beyond a predetermined level.

Another type of automatic feed pressure regulator is shown in U.S. Pat. No. 2,322,741 to Osgood. In this device, the feed control is automatically responsive to variations in the resistance to drill bit penetration.

U.S. Pat. Nos. 4,328,872; 4,371,040; and 4,478,290 to Orthwein disclose various mechanisms for preventing buckling of the pinning rod.

SUMMARY OF THE INVENTION

One object of the present invention is to provide an anti-buckling device for mine roof bolting machines which can accurately determine a maximum permissible thrust to be applied to a pinning rod (also known as a drill rod or drill steel) in order to ensure that the pinning rod will not buckle while it is used to drill a hole in the mine shaft roof.

A further object of the present invention is to provide an anti-buckling device for mine roof bolting machines in which there is no need for specially machined cams or the like in order to affect an anti-buckling function.

An additional object of the present invention is to employ ultrasonic distance measurement to determine the unrestrained length of the pinning rod without having any mechanical part of the bolting machine make physical contact with the mine roof.

One more object of the present invention is to employ two or more ultrasonic sensors arranged on or around the torque motor in order to compare ultrasonic returns and thus determine the position of the pinning during the time that the ultrasonic transceivers are in operation.

Yet a further object of the present invention is to provide an anti-buckling device which can easily be adapted for use with different types of mine roof bolting machines.

Another object of the present invention is to provide an anti-buckling device for mine roof bolting machines which automatically monitors and stores an indication of the mine roof height.

In accordance with the above and other objects, the present invention comprises a mine shaft roof bolting machine for inserting bolts into a mine shaft roof. The bolting machine comprises a torque motor, a pinning rod held for rotation by the torque motor, and a structure for applying an upward thrust to the torque motor and pinning rod. The invention also includes a device for operating the applying means. The device functions to determine the length of the pinning rod exposed below the mine roof and calculates the maximum thrust which can be applied to the pinning rod without causing a buckling failure of the pinning rod. Responsive to the calculation, the device controls the upward thrust to the pinning rod in order to maintain the upward thrust at a level equal to or below the maximum level.

The invention also includes a structure for measuring the height of the mine roof.

The invention may include a computer programmed to carry out the functions of determining the length of the pinning rod, calculating the maximum upward thrust, and controlling the upward thrust.

The invention may include a computer programmed to accept and use the electrical output from ultrasonic transceivers and their associated electronics as well as from pressure transducers, rotary encoders, and all similar electronic sensors to detect pressure, force, linear motion, linear velocity, and angular motion and velocity.

The measurement of the height of the mine roof is carried out by sensing contact between a switch on the torque motor housing and the mine roof and, responsive to the contact, an indication of the elevation of the torque motor is stored.

The measurement of the exposed length of the pinning rod may also be carried out by electronically measuring the echo time for an ultrasonic pulse, or pulses, from the mine roof back to one or more ultrasonic transceivers on the torque motor housing. This time, along with either a standard value for the speed of sound or an associated measurement of the echo time from a reflecting surface at a known distance from one or more of the ultrasonic transceivers, may be used to calculate the distance from the torque motor housing to the mine roof. This distance is identical to the exposed length of a pinning rod, or perhaps of a pinning rod and wrench, which extends upward from the torque motor to the mine roof. This distance is stored in microprocessor memory for use in calculating the maximum thrust that may be applied to the pinning rod.

In order to control the maximum upward thrust, an indication of the thrust being applied is compared with the maximum calculated thrust and the pressure supplied to the thrust cylinder is varied accordingly.

BRIEF DESCRIPTION OF THE DRAWINGS

FIG. 2 is a schematic elevational view showing the essential elements of a second type of commercially available mine roof bolting machine in which a thrust cylinder with a piston and rod acts directly upon the torque motor as modified for use with the present invention.

FIG. 3 is a schematic elevational view showing the essential elements of a third type of commercially available mine roof bolting machine in which a compound thrust cylinder acts directly upon the torque motor as modified for use with the present invention.

DETAILED DESCRIPTION OF THE PREFERRED EMBODIMENTS

Figure 1:
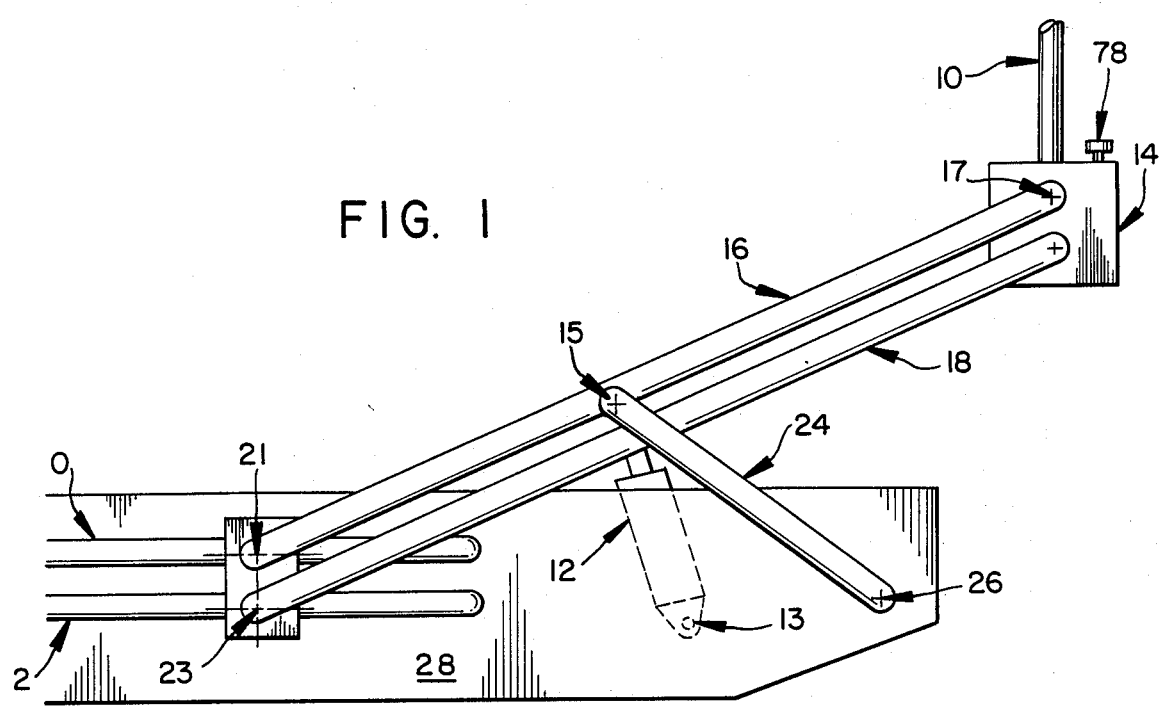
FIG. 1 is an elevational view showing schematically the essential elements of one type of commercially available mine bolting machine modified for use with the present invention.

FIG. 1 shows a partial elevational view of a linkage known as a Scott-Russell linkage, used by several manufacturers of commercially available roof bolters to elevate a torque motor 14, a pinning rod 10, and a bit (not shown). Pinning rod 10 (also called a drill rod) is forced upwardly into a mine roof (not shown) under thrust from cylinder 12. The bit (not shown) and drill rod 10 are rotated by torque motor 14. Main boom members 16 and auxiliary boom members 18, located on both sides of the torque motor 14, have their respective upper ends pivotally connected to the sides of torque motor 14 and their lower ends respectively mounted at pivots 21 and 23 in a common slider block (or individual slider blocks) which slides in tracks 20 and 22. Forward links 24 are each pivotally mounted to one of the two main boom members 16 at one end and mounted to allow rotation at the other end about stub shafts 26 on either side of frame 28 of the roof bolter. The lower end of cylinder 12 is also pivotally mounted to frame 28 through pin 13 so that, as the cylinder rod is extended the cylinder 12 and forward link 24 rotate about their respective pivot points, causing the slider block to move forward as boom members 16 and 18 rotate about pivot points 21 and 23. The boom members also rotate about their pivot points on torque motor 14 as it remains vertical as it is forced upward toward the roof and the rotating pinning rod and drill bit are forced into the roof.

FIG. 2 shows a portion of a second type of commercially available roof bolting machine of the Fletcher type. In this machine, the thrust cylinder 30 may be supported by a twin boom indicated by frame members 36 and 38 and acts directly upon the torque motor 34 and pinning rod 10. The torque motor 34 itself is constrained from rotating by a guide frame (not shown).

In the thrust cylinders of the rod and piston type as shown in FIG. 2, the rod extension may be measured directly and the measurement transmitted to a microprocessor by an internal measuring system patented by Tellerman, U.S. Pat. No. 3,898,555. The thrust cylinder so instrumented may be either mounted on a twin boom indicated by frame members 36 and 38 in FIG. 2 so that it may be elevated near the roof, attached directly to the bolting machine, or used to elevate a torque motor mounted on a Scott-Russell linkage as in FIG. 1.

FIG. 3 shows a portion of a type of commercially available roof bolting machine which is manufactured by Fletcher. This device comprises a telescopic hydraulic cylinder 30 having inner members 31 and 32 which extend under hydraulic pressure. The torque motor 34 is attached to member 32 and it and the telescopic sections are prevented from rotating by an external guide frame (not shown). Although it too may be mounted as described in the previous paragraph, it is usually limited to Fletcher type machines.

Figure 4:
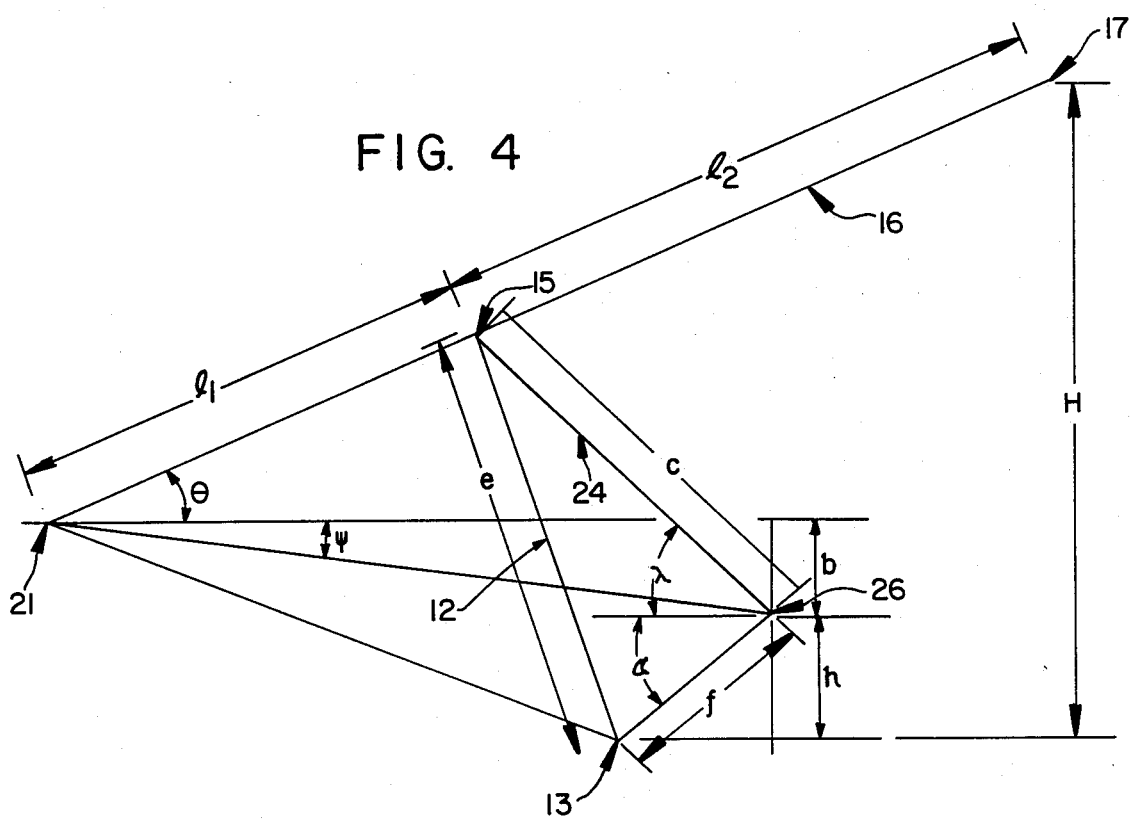
FIG. 4 is a schematic representation of the Lee-Norse type of bolting machine with a Scott-Russell linkage showing the parameters associated with the calculation of torque motor position and of thrust to be applied according to the Euler and Johnson type equations as they relate to the device in FIG. 1.

Not all of the bolter dimensions and angles involved in calculating the permissible thrust for a particular rod length are evident in FIG. 1. They are, therefore, shown in FIG. 4. In FIG. 4, points 21, 15, and 17 correspond to pivots 21, 15, and 17 in FIG. 1 and lie on main boom member 16. Line 24 in FIG. 4 corresponds to the center line of member 24 in FIG. 1 and accordingly terminates at points 15 and 26, which correspond to pivots 15 and 26 in FIG. 1. Distance H in FIG. 4 represents the elevation of pivot 17 on the torque motor as measured from its lowest point when the boom is lowered. The straight line along which H is measured when the torque motor is at its uppermost position will be taken as vertical and the line through point 21 in FIG. 3 relative to which $\theta$ and $\psi$ are measured will be taken as horizontal in the following discussion. Point 26 lies a distance b below the horizontal through point 21 and a distance h above the lowest elevation of point 17. The total distance between points 13 and 15 is represented by e, which is the length of the thrust cylinder plus the extension of the cylinder rod.

In the roof bolters shown in part in FIGS. 1 and 2, excess thrust produced by cylinders 12 and 30 may result in buckling of pinning rod 10. Accordingly, a mechanism must be provided to ensure that such buckling does not occur. The present invention provides several mechanisms for accomplishing this, all of which use a microprocessor to relate the pressure in cylinder 12 and 30 according to the unconstrained length of the pinning rod as measured by one or more of several sensors. The equations which the microprocessor is programmed to solve are displayed in Table 1, below, and definitions of the symbols involved are given in the following Notation section.

TABLE 1

Formulas for Lee-Norse type machines $$T = \left(1 + \frac{l_2}{l_1}\right)\frac{F}{\Gamma} \tag{1}$$

$$\Gamma = \frac{f}{e}(\sin\lambda + \cos\alpha \tan\lambda) + \tag{2}$$

$$\frac{c}{e}[\sin(\lambda + \psi) - \cos(\lambda + \psi)]\tan\lambda$$

$$\lambda = \cos^{-1}\left(\frac{f^2 + c^2 - e^2}{2fc}\right) - \psi - \alpha \text{ cylinder } e \tag{3}$$

$$H = (l_1 + l_2)\sin\theta + h + b \tag{4}$$

$$\theta = \sin^{-1}\left[\frac{c}{l_1}\sin(\lambda - \psi)\right] - \psi \tag{5}$$

$$e^2 = f^2 + c^2 - 2fc\cos(\lambda + \psi + \alpha) \text{ encoder } \lambda \tag{6}$$

$$\frac{F\tan z}{\tan z - z} = \frac{\sigma_e\pi}{4\zeta\delta} \cdot \frac{r_o^4 - r_i^4}{r_o} \tag{7}$$

$$\delta = l_2\left[1 - \left(\frac{c}{l_1}\sin\lambda\right)^2\right]^{\frac{1}{2}} - c\cos\lambda - x_o \tag{8}$$

$$z = \left(\frac{4F}{E(r_o^4 - r_i^4)}\right)^{\frac{1}{2}}(H_o - H) \tag{9}$$

Formulas for Fletcher type machines $$T = F \quad H = e + h \tag{10}$$

Formulas for both types of machines $$H_c = \pi\left[\frac{2E}{\sigma_y}(r_o^2 + r_i^2)\right]^{\frac{1}{2}} \tag{11}$$

If $H_o - H \leq H_c$ \hfill (12)

$$F = \frac{\sigma_y\pi}{\zeta}(r_o^2 - r_i^2)\left[1 - \frac{\sigma_y}{E}\cdot\frac{(H_o - H)^2}{\pi^2(r_o^2 + r_i^2)}\right] \tag{13}$$

If $H_o - H > H_c$ \hfill (14)

$$F = \frac{\pi^3 E}{4\zeta}\cdot\frac{r_o^4 - r_i^4}{(H_o - H)^2} \tag{15}$$

$$P_c = \frac{T}{A_c} + \frac{A_h}{A_c}P_h \tag{16}$$

Formula for SEND1

$$V(I) = V(I-1) + \frac{[V(I-1) - V(I-2)]\frac{A_h}{A_c}[P_h(I) - P_h(I-1)]}{P(I-1) - P(I-2) + \frac{A_h}{A_c}[P_h(I-1) - P_h(I-2)]}$$

$$+ \frac{[V(I-1) - V(I-2)][P(I) - P(I-1)]}{P(I-1) - P(I-2) + \frac{A_h}{A_c}[P_h(I-1) - P_h(I-2)]} \tag{17}$$

Formula for SEND2

$$V(I) = \frac{V_a P_b - V_b P_a + (V_b - V_a)\dfrac{A_h}{A_c} P_h(I)}{P_b - P_a} + \frac{V_b - V_a}{P_b - P_a} P(I) \tag{18}$$

Notation $A_c$ Area of the piston facing the cap end of the thrust cylinder 12, FIG. 1 or cylinder 30. FIG. 2
$A_h$ Area of the piston facing the head end of the thrust cylinder 12, FIG. 1 or thrust cylinder 30, FIG. 2
b Distance parallel to H between point 26 and a perpendicular to H through point 21, FIG. 4
c Length between pivot points 15 and 26 on member 24, FIG. 4
E Elastic modulus, also known as Young's modulus
e Length between pivot points 13 and 15 along center line of member 12
F Force on drill rod 10, FIG. 1. Reacts at 17, FIG. 4
$F_c$ Calculated maximum force
f Distance between points 13 and 26, FIG. 4
H Present height of point 17 on torque motor 14 measured from the lowest elevation of point 17
h Elevation of pivot point 26, FIG. 4, above the lowest elevation of pivot point 17
$H_c$ Critical height, defined by equation (10)
$H_f$ Elevation of face of downward aimed ultrasonic transceivers
$H_h$ Vertical distance between faces of upward and downward aimed ultrasonic transceivers
$H_o$ Roof height measured from the lowest position of pivot point 17 on torque motor 14, FIG. 4
$H_r$ Elevation of face of upward aimed ultrasonic transceiver
$l_1$ Length from pivot 21 to pivot 15, FIG. 4
$l_2$ Length from pivot 15 to pivot 17, FIG. 4
$P_a$ Lowest pressure in the linear range of the pressure control valve 49, FIG. 5
$P_b$ Highest pressure in the linear range of the pressure control valve 49, FIG. 5
$P_c$ Pressure at the cap end of the thrust cylinder 12, as either measured or commanded at the Ith step, FIG. 5
$P_h$ Pressure at the head end of the thrust cylinder 12, as measured at the Ith step, FIG. 5
$P_I$ Pressure from the first of two redundant pressure sensors
$P_{II}$ Pressure from the second of two redundant pressure sensors
$P_{(I)}$ $P_c$ at the Ith iteration step
$r_o$ Outside diameter of the pinning rod
$r_i$ Inside diameter of the pinning rod
$S_{Ii}$ Values obtained from redundant sensors Ii, i=1, 2
T Thrust exerted by cylinder 12 acting on pivot 15, FIG. 5
$V_a$ Lowest voltage within the linear range of pressure control valve 49, FIG. 5
$V_b$ Highest voltage within the linear range of pressure control valve 49, FIG. 5
V(I) Voltage computed in iteration I
$V_I$ Voltage command from the active of two redundant microprocessors
$V_{II}$ Voltage command from the passive of two redundant microprocessors
$x_o$ Horizontal distance between points 26 and 17 when 17 is at its lowest elevation
z Dummy variable defined by equation (13)
α Angle from line f, FIG. 4, and the perpendicular to H
Γ Variable defined by equation (2)
$\Delta_i$ Specified error limit for value indicated in the relation in which it appears for i=1, 2, 3
ΔI Maximum allowable integer difference
Δ Maximum allowable real number difference
δ Deviation of point 17, FIG. 6, from a straight line between the lowest and highest points reached by point 17
η Safety factor
θ Angle between link 16 and line perpendicular to H, FIG. 4
λ Angle between center line of member 24, FIG. 6, and a perpendicular to the vertical (intended line of motion of the torque motor)
$\nu_e$ Endurance stress of the pinning rod
$\nu_y$ Yield stress of the pinning rod
ψ Angle between line from point 21 to point 26 and a perpendicular to vertical line H, FIG. 4.

Figure 5:
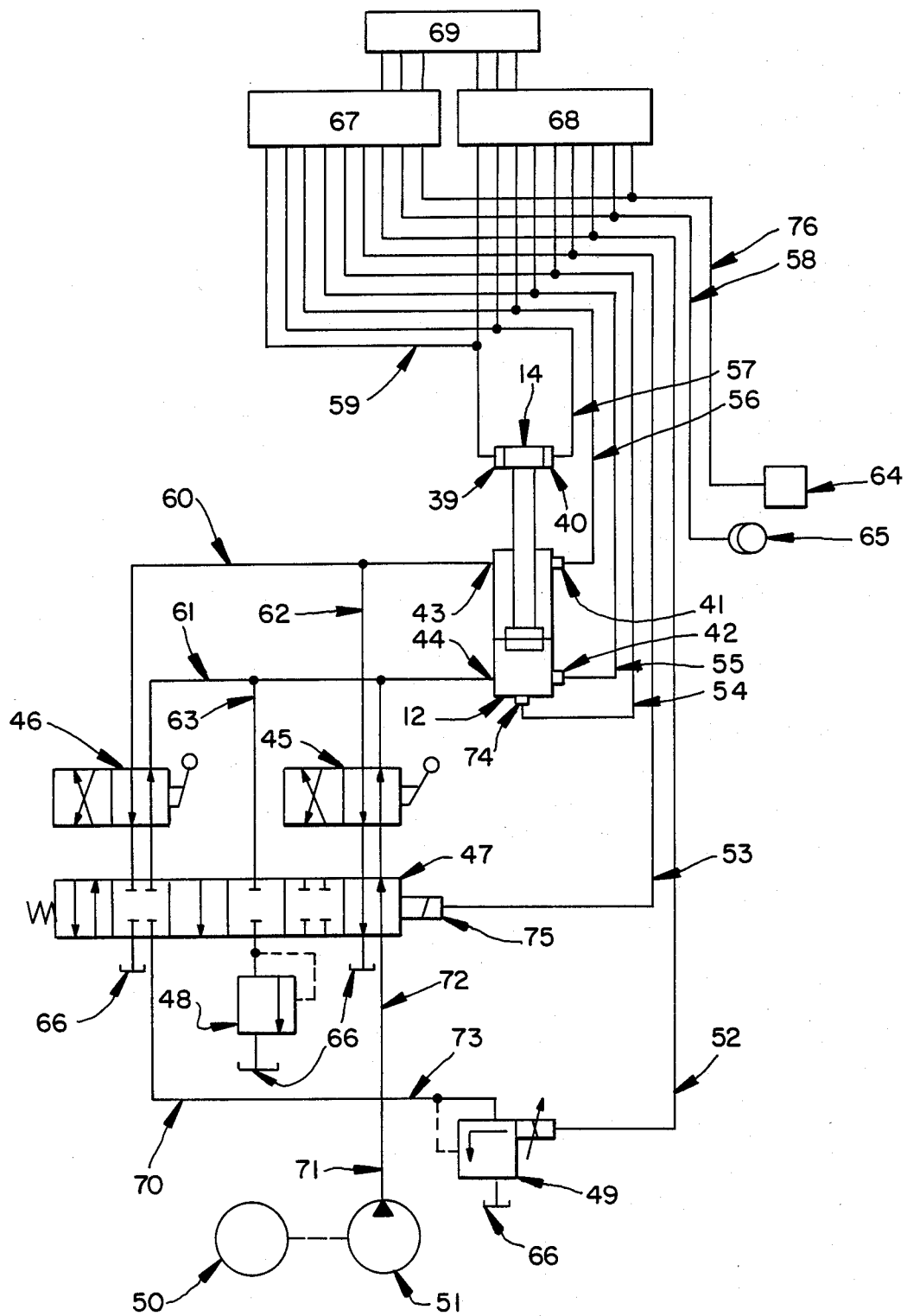
FIG. 5 is schematic of the essential components of a hydraulic circuit providing a controlled upward thrust in accordance with the present invention. Other components found in the working hydraulic circuit to improve its performance, but not essential to its principles of operation, are omitted. These include filters, anti-cavitation circuits, and other such items.

FIG. 5 is a representative schematic of both the hydraulic and electric circuits to implement buckling control. Only the essential elements are shown; filters, cavitation controls, and similar devices which would be obvious to one of ordinary skill in the art are not displayed.

Motor 50 drives pump 51 which supplies hydraulic fluid under pressure to line 71 and to lines 70, 72, and 73 which join line 71. Line 72 supplies pressure through control valves 47 and 45 to port 44 at the cap end of thrust cylinder 12, causing the piston to extend the rod and raise the torque motor to the roof and force the drill rod into the roof. The fluid flows from the head end through exhaust port 43 as the piston moves forward. Return flow is through line 62, valves 45 and 47, to reservoir 66. All reservoirs, incidentally, are numbered 66 to indicate they represent a single reservoir on the machine.

When directional control valves 45 and 47 are in the positions shown in FIG. 5 the pressure to cylinder 12 is automatically controlled by microprocessor 67 which controls the command voltages sent to the solenoid controlled relief valve 49 which is connected to pressure line 71 through line 73. In other words, it is this pressure control valve and its associated circuitry that enables the microprocessor to control the high pressure as the operator controls upward and downward motion with the manual directional control valve 45.

Cylinder head and cap pressures are measured by pressure transducers 41 and 42, respectively, which send an analog voltage over electric lines 55 and 56 to microprocessors 67 and 68. A redundant cap pressure can be found using a second sensor 74 which transmits its signal through line 54.

Moving manual control 45 to the right causes pressurized fluid to be directed to the head of cylinder 12, causing the piston to retract the rod. Return flow from port 44 is directed to reservoir 66.

When solenoid 75 is de-energized, it allows the spring connected to valve 47 to move the valve body to the right, block flow to valve 45, and direct pressurized fluid to valve 46 from line 70. The bolting machine operator must then move to valve 46 which directs high pressure to cylinder 12 through line 61. Return flow is through line 60 and valves 46 and 46 to the reservoir. Maximum drilling pressure is controlled by the manually adjusted pressure relief valve 48 when control valve 46 is pressurized.

Changing from directional control valve 45 to valve 46 emphasizes to the machine operator that solenoid 75 is off and the pressure is no longer automatically controlled.

The piston of the thrust cylinder may be directly connected to torque motor 14 as shown in FIG. 2, cylinder 30, for a Fletcher type machine, or it may be connected through a linkage, as shown in FIG. 1, cylinder 12, for a Lee-Norse type machine. Since the operation of the hydraulic and electric circuits shown are unaffected by the cylinder's connection to the torque motor, the schematic in FIG. 5 will be used for both.

Sensors 39 and 40, shown on torque motor housing 14 in FIG. 5, represent either ultrasonic transceivers or contact switches mounted directly on the housing as illustrated. They are also used to represent the second set of sensors considered in Method 5, discussed below.

Additional sensor lines 58 and 76 are from rotary encoders 65 and proximity detector 64, which are used in Methods 1, 3, 4 and 6, discussed below.

A dual-port memory 69 is required for mutual cross-checking between microprocessors 67 and 68 as explained in the discussion of routines REPEAT I and REPEAT II, discussed below. Two microprocessors 67 and 68 are provided for redundant control. Microprocessor 67 is referred to as the active microprocessor and microprocessor 68 is referred to as the passive microprocessor in the discussion set forth below.

If redundant sensor signals are in disagreement, if the microprocessors disagree on the pressure command to be sent, or if any other errors sufficiently serious to shut down automatic pressure control are found by the microprocessors, the voltage necessary to hold valve 47 in the position shown will be removed and the spring load on the valve will cause it to move one position to the right. This will stop fluid flow through line 71 and valve 45 and divert it to line 70 and valve 46 as discussed in previous paragraphs. This operation will be discussed in greater detail below.

Figure 6:
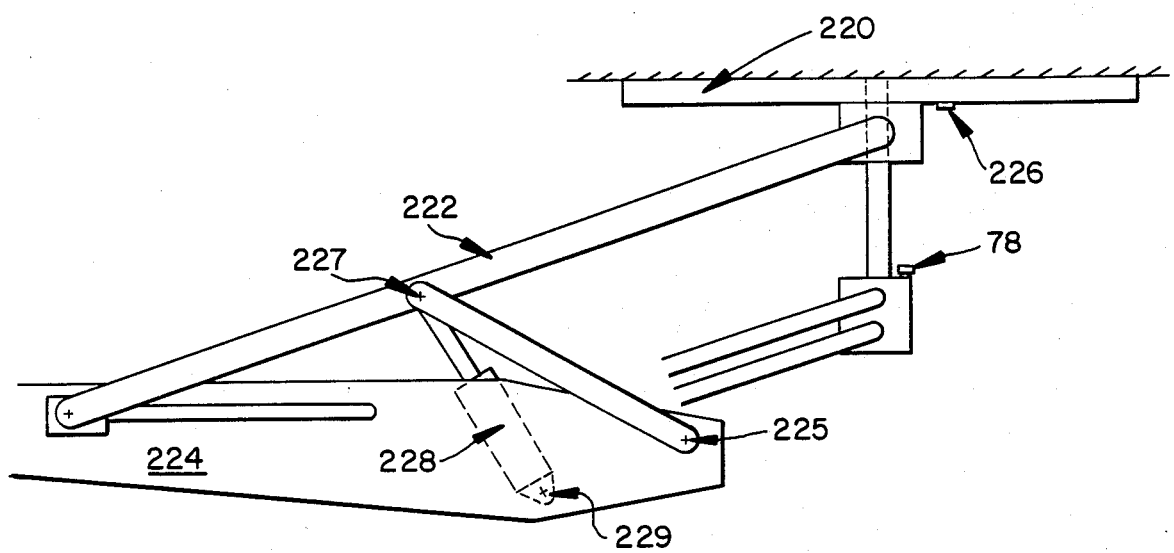
FIG. 6 is an elevational schematic of the linkage involved in the roof support system shown in relation to the torque motor and pinning rod.

FIG. 6 shows a typical roof support system for either the Lee-Norse type or the Fletcher type of bolting machine. Roof support frame 220 is held above the machine operator's position to protect him from rock that may fall from the roof. It is supported by boom 222, link 225, and a separate thrust cylinder 228 pivotally connected to the bolter frame at pivot 229 and to the roof support frame at pivot 227. A boom parallel to boom 222 and a link parallel to link 225 are pivotally attached to the far side of the bolter carriage and the roof support frame 220. This is a conventional configuration and will not be described in further detail here.

A contact switch 78 is provided for indicating when the thrust motor has reached the roof. For redundant control a plurality of contact switches are provided. Switch 78 closes to provide a signal when it contacts the roof. In the operation of the present invention it is very important that the signal from switch 78 be a reliable indication that the thrust motor has contacted the roof in order that an accurate indication of the roof height is attained. In order to further reduce the probability of a false indication of roof contact due to depression of the contact switch by other than actual contact with the roof, either a capacitive or a magnetic proximity sensor 226 may be mounted on the roof support frame as shown in FIG. 6.

Mining regulations require that a roof support be used at all times so that the roof support frame will always be available as a reference to assure that switch 78 is only activated when it is close to the roof.

Figure 7A:
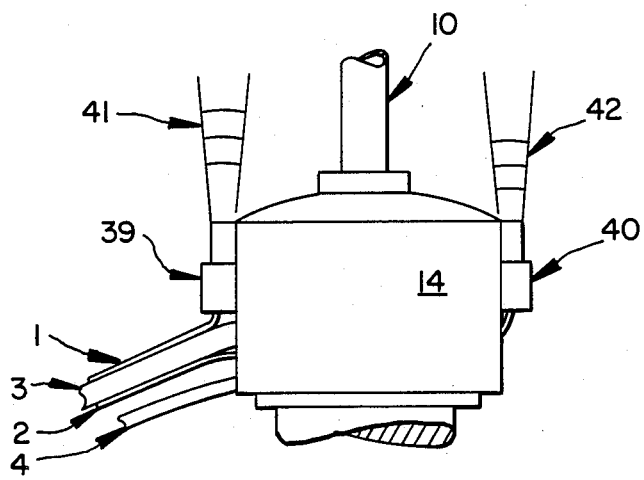
FIG. 7(a) shows the torque motor housing fitted with two ultrasonic transceivers on a Fletcher type machine. The transceivers may either be aimed directly upward or they may be aimed at a reflecting plate which it turn directs the sonic signal directly upward.

It has been assumed in the preceding discussion that the roof support frame is always in contact with the roof. In practice this is often not true because rock fallen from the roof has raised the remaining surface to an elevation above the uppermost position of the roof support frame. Although the proximity sensor 226 attached to the roof support frame shown in FIG. 6 may indicate the uppermost position of the torque motor, the contact switch 78 will not be in contact with the roof and will not be closed and, therefore, no measure of the roof height will be obtained. This difficulty may be overcome by attaching ultrasonic transceivers 39 and 40 to the torque motor housing 14 as shown in FIGS. 7(a) and (b). These transceivers may be aimed either upward, parallel to the pinning rod 10, or they may be mechanically shielded to protect them from falling rock and gravel and aimed horizontally toward small metal reflectors which reflect the ultrasonic pulse upward. These metal reflectors may be mounted on a frame designed to shed debris. Small stones and dust on the reflector plate will not affect the reflection because of the wavelength of the ultrasonic waves.

Figure 28:
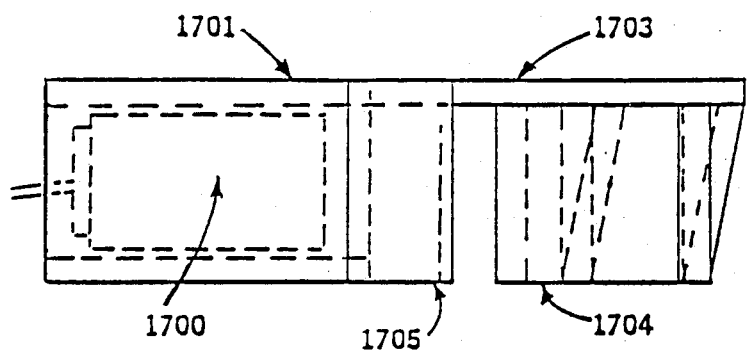
FIG. 28 is a top plan view of a reflector shield to be used with the sensors of the present invention.
Figure 30:
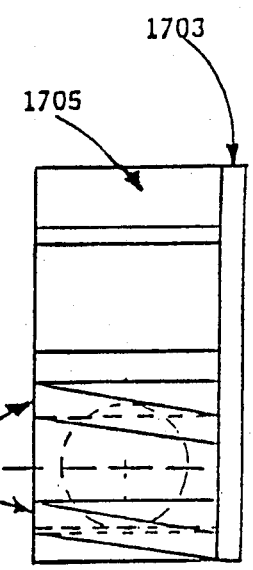
FIG. 30 is a front elevational view of the reflector shield of FIG. 29.
Figure 29:
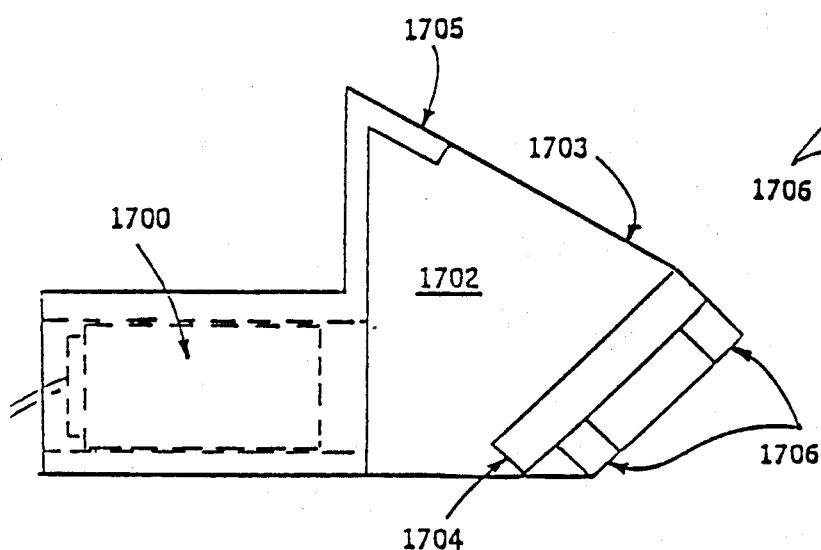
FIG. 29 is a side elevational view of the reflector shield of FIG. 28.

An example of a reflector to be used with an ultrasonic transceiver is shown in FIGS. 28, 29 and 30. As can be seen in FIGS. 28-30, a housing and reflector support 1702 includes a chamber to house an ultrasonic transceiver 1700 whose emission is directed toward reflector plate 1704 which is either welded or screwed to back plate 1703 and wedge shaped support brackets 1706. The purpose of reflection plate 1704 is to reflect upward the ultrasonic beam transmitted horizontally from transceiver 1700 to plate 1704. Shield 1705 provides additional protection against large rocks by absorbing some of the shock and tending to deflect them from the reflector plate.

Each ultrasonic distance measuring device 39, 40 consists of an ultrasonic transceiver which transmits an ultrasonic pulse at the command of an external source and detects the returning ultrasonic reflection and produces an electrical pulse in response to the detected ultrasonic signal. The command to the transceiver is produced by an electrically powered chip, such as one manufactured by National Semiconductor, which also receives the output signal as an electrical charge produced by the transceiver upon detecting the reflected ultrasonic pulse. The chip then produces an output voltage. The command to the chip to trigger the transceiver is produced by the microprocessor and the voltage pulse produced by the chip is sent to the microprocessor which then calculates the range to the target using its clock and its program. By measuring the amplitude of the returning pulses from three or more transceivers operating on the same frequency and placed on a circle centered at the pinning rod it is possible to detect the position of the pinning rod if it deviates from the central axis by changes in the received signals. It should be understood that the rod can deviate from the central axis defined by the transceivers either by bending along its length due to excessive force being applied or by being misaligned in the first place. According to the present invention, both the deviation and the direction of deviation can be detected.

The transceivers are fired sequentially so that one transceiver transmits while the others are receiving. For example, if three ultrasonic transceivers 39A, 39B, and 39C are placed around the pinning rod 10, as shown in FIG. 8(c), transceiver 39A, for example, is transmitting while transceivers 39B and 39C are receiving the signal transmitted by transceiver 39A. In this manner, the pinning rod 10 will interfere with the transmitted and reflected signals and the position of the pinning rod can be determined. If the pinning rod is deflected in a direction generally between transceivers 39A and 39B, for example, the signals transmitted and reflected back and forth between these transceivers will become weaker thus indicating the fact of a deflection and the general direction of deflection.

If a more accurate indication of the deflection direction is required, empirical data can be stored in a table indicating the expected reduction in received signal levels at each of the transceivers for various bending directions. The actual received signal levels can then be compared to these stored values in the microprocessor to provide a bending direction indication. By increasing the number of transceivers placed around the pinning rod, it is also possible to more accurately determine the direction in which the pinning rod is deflected.

When there is an indication that the pinning rod is deflected, the microprocessors 67, 68 respond by reducing the thrust applied to the pinning rod and/or sounding an alarm.

Figure 7B:
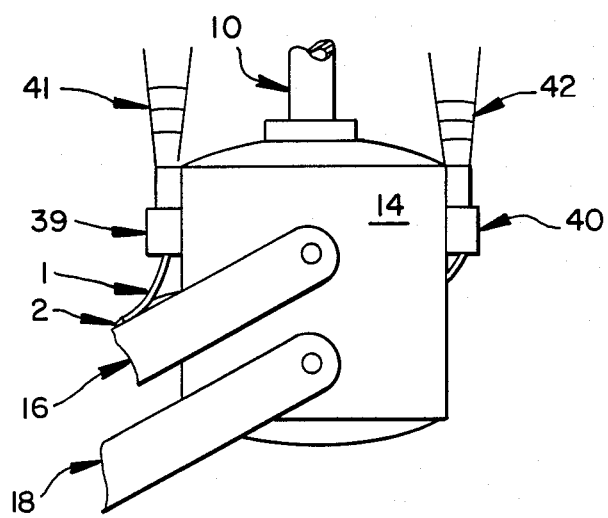
FIG. 7(b) shows the torque motor housing fitted with two ultrasonic transceivers on a Lee-Norse type machine. The transceivers may either be aimed directly upward or they may be aimed at a reflecting plate which it turn directs the sonic signal directly upward.

Electrical wiring 1 and 2 from the transceivers may be attached either to a hydraulic hose 3 on a Fletcher type machine, as in FIG. 7(a) or to the main boom 16 as illustrated in FIG. 7(b).

Returning again to FIG. 5, it will be understood that the proximity sensors 78, 226, 39, 40 and 1700, discussed above, can, with respect to the circuitry, all be considered to be represented generally by proximity sensor 64 and other rotary encoders or similar encoders or resolvers may be represented by encoder 65.

Figure 8A:
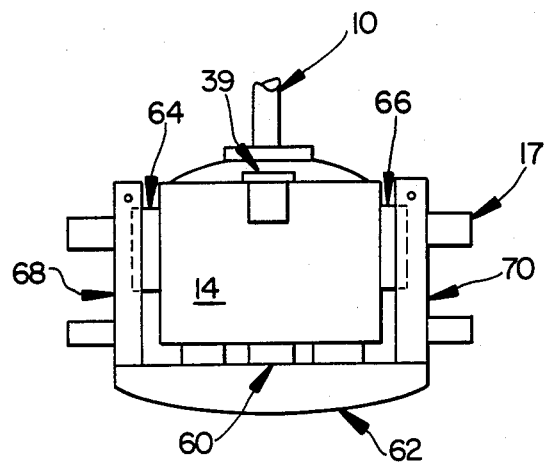
FIGS. 8a, 8b and 8c show the torque motor saddle which supports the torque motor/housing by means of two guides and four load cells. (At least one cell must be used to measure vertical force. Use of four permits detection of pinning rod bending.) Vertical guides resist torque but permit limited vertical motion and a small rotation from the vertical.
Figure 8B:
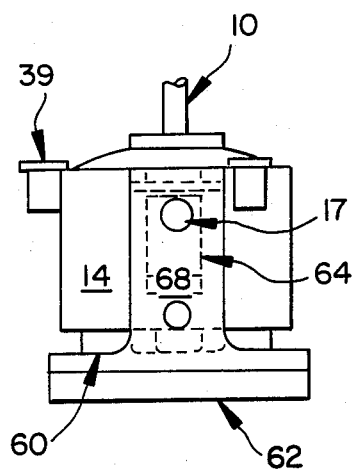
Figure 8C:
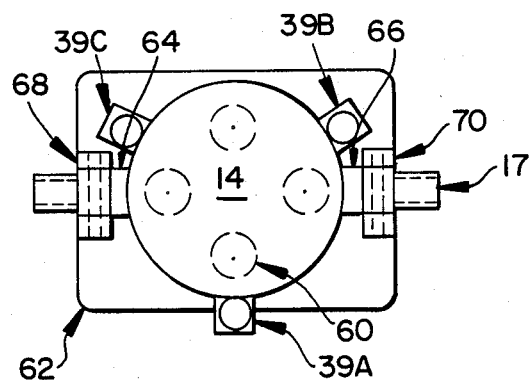

FIG. 8 shows a cradle, 62, for the torque motor support. It is designed to support torque motor 14 on four load cells, one of which is labeled 60, so that the thrust on the pinning rod may be measured directly as the sum of the loads read from each cell. This eliminates much of the analysis required to relate the pressure in the thrust cylinder to the thrust on the pinning rod. In FIG. 8 torque motor 14 is rigidly attached to slide bars 64 and 66 which slide in slots machined in arms 68 and 70 of cradle 62. Load cells 60 resist downward motion of torque motor/housing and pins 72 and 74 retain guide blocks 64 and 66 in arms 68 and 70. The three ultrasonic transceivers 39A, 39B, and 39C measure the distance to the mine roof, which is also the unsupported length of the pinning rod 10. These may be the same transceivers which are used to determine deflection of the pinning rod, as discussed above.

The remaining figures pertain to the program installed in the associated microprocessor, or microprocessors. Therefore, their discussion will follow a listing of the equations involved. It will be understood that the individual equations were set forth above in Table 1. These equations will be referred to below based on their equation number given above.

Equations Used in Each Method on Lee-Norse Type Machines

The choice of equations to be used depends upon the method selected for measuring pinning rod length and the type of bolting machine upon which the invention is installed.

Five distinct methods may be applied to a Lee-Norse type bolting machine.

Method 1

Equations used: (1), (2), (3), (4), (5), (7), (8), (9), (11), (12), (13), (14), (15), (16) (17), (18).

In this method the pinning rod length is determined as the difference between the present elevation of the torque motor as calculated from the measured extension of the thrust cylinder 12, FIG. 1, and the elevation of the roof as recorded from the last drilling operation when the contact switch 78 on torque motor 14, FIG. 1, was activated by contact with the mine shaft roof.

Bolting cannot be started after the bolting machine is turned on until the torque motor is first raised to the roof to depress contact switch 78, FIG. 1, which requires a nominal 400 pound force to depress. This force is required to depress a spring (not shown) mounted between the contact plate of the switch and the torque motor housing. Its purpose is to prevent the switch from being easily depressed without its contacting the mine roof.

After bolting has started, the present elevation of the torque motor is found by measuring the extension of the rod in thrust cylinder 12, FIG. 1, using a device patented by Tellerman, U.S. Pat. No. 3,898,555, the disclosure of which is incorporated herein by reference.

Variable e is the sum of the extension of rod in thrust cylinder 12 plus the length of the cylinder when the rod is fully retracted. Since quantities f, c, $\alpha$, and $\psi$, FIG. 4, are all known from the dimensions of the machine, $\lambda$ may be calculated from equation (3) and then $\theta$ may be calculated from equation (5). Since $1_1$, $1_2$, b, and h, FIG. 4, are also known machine dimensions, present elevation H may be calculated from equation (4).

The required thrust T may now be determined from equations (1) and (2) based upon the force found from either equations (13) or (15) as selected by conditions (12) and (14) using $H_c$ as found from equation (11), which involves quantities determined by the pinning rod used as defined in the Notation section.

Analysis of the motion of the torque motor as it rises from H=0 to H=$H_o$ shows that it does not follow the desired straight line shown in FIG. 4 but deviates an amount $\delta$ given by equation (8). This causes additional bending stress in the rod, as given by F in equation (7) in which z is defined by equation (9) which also involves F. The equation obtained by substituting $\delta$ from equation (8) and z from equation (9) into equation (7) may be solved for F by using a bisection method in the microprocessor and the F so obtained is compared with the force F found from either (13) or (15), as appropriate. A flowchart for a bisection routine may be found in a paper by Orthwein, W.C., entitled *Drum Brake Design* and published in Computers in Mechanical Engineering, vol. 2, no. 3, pp. 51-56, the disclosure of which is incorporated by reference.

Thrust T in equation (1) is calculated from the smallest F found from equation (7) and either equation (13) or (15).

Equation (16) is called to find the pressure $P_c$ required to provide thrust T and equations (17) and (18) are used with this value of $P_c=P(I)$ to calculate the voltage pulse V(I) to be sent to the pressure control valve 49, FIG. 5, which limits the maximum pressure to thrust cylinder 12, FIGS. 4 and 5.

METHOD 2

Equations used: (1), (2), (4), (5), (6), (7), (8), (9), (11), (12), (13), (14), (15), (16) (17), (18).

An initial measurement of roof height is required before the roof drilling process is begun, as in Method 1.

In this method, a rotary encoder is used to measure $\lambda$. Its shaft is attached to link 24 at the center of pivot 26 so that the shaft rotates with the rotation of link 24 about pivot 26 in FIG. 1. Its frame is clamped in a bracket mounted on carriage 28, FIG. 1, so that the encoder body does not rotate with respect to carriage 28. This value of $\lambda$ is inserted into equation (6) to determine extension e and into equation (5) to calculate $\theta$ since all other parameters in both equations are known. This value of $\theta$ is substituted into (4) to find H, which is then used with equations (11) and (13) or (15), as determined by the satisfaction of either inequalities (12) or (14), to find permissible axial force F on the pinning rod. In all cases $H_o$ is recalled from memory where it was stored during the last drilling operation.

H and $\lambda$ are also substituted into (7), (8), and (9) to find the permissible force as limited by bending and the smaller value of F is substituted into equation (1) to calculate the permissible thrust from cylinder 12, FIGS. 1 and 4. Again equations (17) and (18) are used to calculate the voltage command to be sent to the pressure control valve.

In both methods 1 and 2 rotary encoders may be attached to pivot 225 to obtain a redundant measurement of roof height in those cases where the roof support is in actual contact with the roof. Since the roof support is also elevated by a thrust cylinder distinct from but similar to thrust cylinder 12, FIG. 1, it too may be fitted with extension measuring instrumentation (Tellerman's invention) so that it may be used to find a redundant measure of roof height $H_o$.

Method 3

Equations used: (1), (2), (7), (8), (9), (11) through (18) inclusive.

In this method it is not necessary to make an initial measurement of roof height before the drilling process can begin.

This method employs ultrasonic transceivers 39 and 40 attached to the sides of the torque motor housing 14, FIG. 7, so as to send and receive ultrasonic pulses to and from the roof in a direction parallel to the axis of the pinning rod. Distance measurements from the torque motor to the roof are made every 0.1 second or less during the drilling process. This distance thus measured is the exposed length of the pinning rod, represented by $H_o-H$.

Cylinder extension is measured by means of the instrumentation used in Method 1.

Cabling to transceivers 39 and 40 will be clamped to boom link 16 as shown in FIG. 7 and then to a microprocessor on the bolter frame.

As mentioned, quantity $H_o-H$, which is equal to the exposed pinning rod length, is measured directly by the ultrasonic transceivers. It is substituted into inequalities (12) and (14) to determine whether F should be calculated from equation (13) or (15). Extension e read from the device used in Method 1 is substituted into equation (3) to find $\lambda$ which is then substituted into equation (2) along with e to find $\Gamma$. Thrust T may then be found from equation (1) and the pressure required found from equation (16). Equations (17) and (18) are then called upon to find the voltage command to be sent to the pressure control valve 49 in FIG. 5 in as indicated in the flowcharts in FIGS. 19 and 20 as to be described in the section of flowcharts.

Method 4

Equations used: (1), (2), (6) through (18) inclusive.

This method differs from Method 3 only in that rotary encoders at pivot points 26 in FIG. 1 are used to measure the elevation of the torque motor. It has the advantage of redundant elevation measurements and may be less expensive to produce.

Method 5

Equations used: All but equation (3)

In this method a second set of ultrasonic transceivers aimed toward the floor rather than the ceiling is attached to the torque motor. They detect the distance to the floor. The sum of the distance measured by the transceivers aimed at the roof and the distance measured by the transceivers aimed at the floor plus their separation on the motor housing should equal the roof height. Recording of the present height and the last few heights, say 10, may be used to detect malfunction of the ultrasonic transceivers. Again measurements may be made at least once every 0.1 seconds.

Transceivers aimed at the floor measure H directly. Substitution into equation (4) yields $\lambda$, which may be substituted into equation (5) to yield $\theta$. Substitution of $\lambda$ into equation (6) produces a value for e, which, when substituted along with $\lambda$ into equation (2), yields $\Gamma$. Thus, it only remains to find F to solve equation (1) for thrust T. Substitution of the $H_o-H$ value obtained from the ultrasonic transceivers 39 and 40, FIG. 5, aimed at the roof into either equations (13) or (15) as guided by the inequalities (12) and (14) produces the needed value of F.

Cap pressure $P_c$ may then be computed from equation (16) and the pressure control voltage obtained from equations (17) and (18) as before.

Equations Used in Each Method on Fletcher Type Machines

Two distinct methods may be applied to the Fletcher type bolting machine depending upon its cylinder construction.

Method 6

Equations used: (10) through (18) inclusive.

In this method the hydraulic cylinder rod extension measuring device patented by Tellerman may be used with a cylinder as shown in FIG. 2. An initial roof elevation measurement must be performed by raising the torque motor to the roof to close the contact switch as in Methods 1 and 2 for the Lee-Norse type machine to provide a starting value for $H_o$.

Once e has been measured, the second of equations (10), $H=e+h$, may be used to find H. Then $H_o-H$ and $H_c$ are calculated and inequalities (12) and (14) are evaluated to determine whether equation (13) or (15) should be used to calculate the limiting force F. Since F=T from the first of equations (10), equation (16) is evaluated to find the pressure to be substituted into either of equations (17) or (18) to find the required command voltage V(I) to be sent to the pressure control valve.

Method 7

Equations used: (10) through (18) inclusive.

This method used ultrasonic transceivers attached to the torque motor as shown in FIG. 7.

It applies to either cylinders having a piston and rod, as in FIG. 2, or to compound or telescopic cylinders as shown in FIG. 7. The Tellerman device cannot be used in compound cylinders because its method of position measurement requires an internal one-piece rod extending from the cap to the head end of the hydraulic cylinder.

$H_o$—H is measured directly. This value is substituted into inequalities (12) and (13) after $H_c$ is calculated from equation (11) to select either equation (13) or (15) for calculation of F from the measured value of $H_o$—H. Only the first of equations (10), T=F, is used to find T for substitution into equation (16). Equations (17) and (18) apply as in the previous methods.

Method Suitable for All Bolter Types

Method 8

Equations used: (11), (13), (15).

This method uses only ultrasonic transceivers and load cells on the motor housing and its support cradle 62 in FIG. 8 to calculate the unsupported length of the pinning rod and to control the pressure in the thrust cylinder. It also requires use of a linear proportioning valve, such as the Towler valve, in order to control the axial load on the pinning rod by sending a sequence of small corrective voltages for pressure control and measuring their effect on the axial force on the pinning rod. Hence, it has the advantage of a much simpler microprocessor program.

The configuration shown in FIG. 8 which is suited to the Lee-Norse type of bolter will be assumed in the following discussion.

Four load cells, all similar to cell 60, mounted as in FIG. 8 resist and measure any forces causing the housing to slide in slots machined in arms 68 and 70. The sum of the load recorded by each cell is the value of the thrusting force on the pinning rod. Since this force is large near the onset of buckling, the small additional force that may be found due to the weight of the hydraulic lines is negligible.

Three ultrasonic transducers 39A, 39B and 39C measure the unsupported length of pinning rod 10 as described in previous methods. Substitution of these values into relations (11), (13), and (14) yields the maximum force that may be applied without buckling. The program in the microprocessor then calls for incremental pressure changes $\Delta P$ until the force measured from load cell(s) 60 agrees with that calculated to within an error $A_c\Delta P$, where $A_c$ is the piston area in the thrust cylinder.

Incipient buckling may be detected whenever a cyclic variation of the loads measured by each of the four load cells is detected. At least three load cells are required if this added safety feature is to be made available. One load cell mounted in the center of the base of cradle 62 may provide axial force data if an incipient buckling backup check is not desired.

The essential features of this method are (a) the direct measurement of the thrust on the pinning rod, (b) control of the thrust by rapid incremental changes in pressure until the thrust reaches a desired value, and (c) pressure adjustments made without the use of proportioning valves or calculations of the relation between cylinder pressure and the force on the pinning rod.

Program Description

Figure 9:
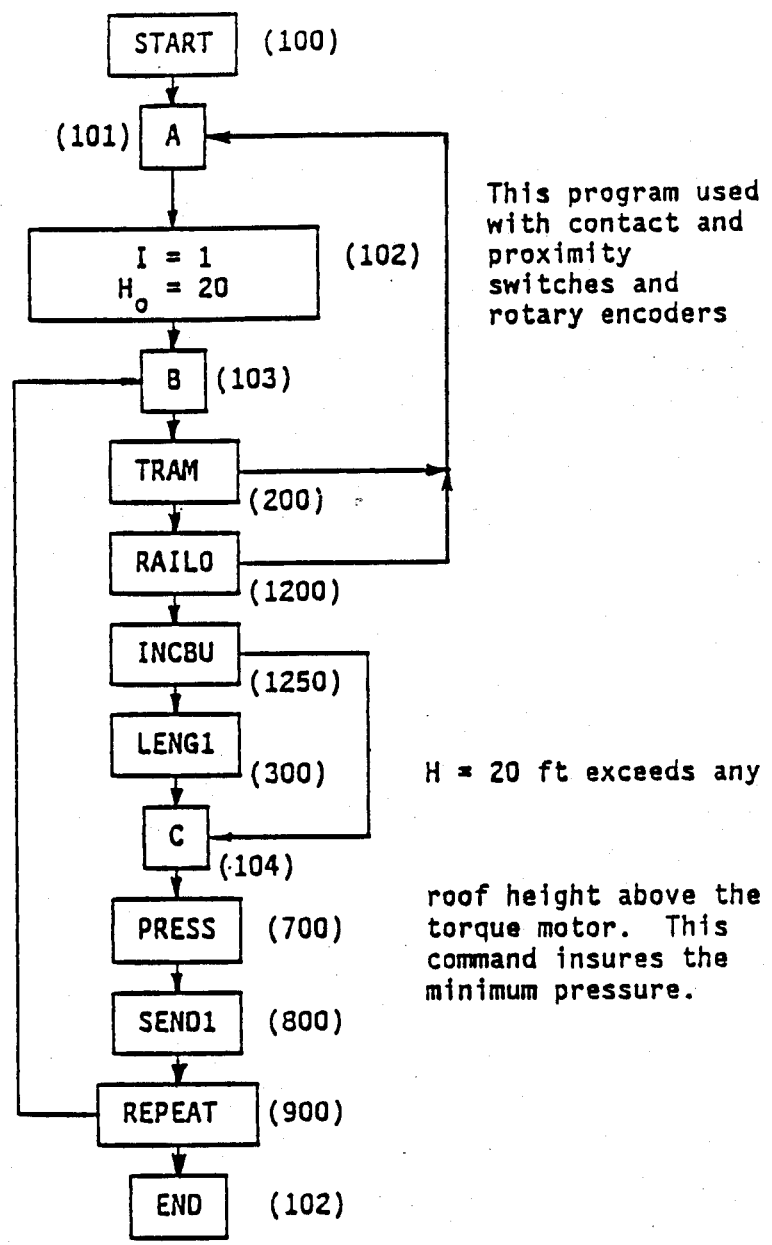
FIG. 9 is the flowchart for the main program for a roof bolting machine using either an instrumented thrust cylinder or rotary encoders on the linkage shown in FIG. 1 for measuring the exposed length of the pinning rod.
Figure 10:
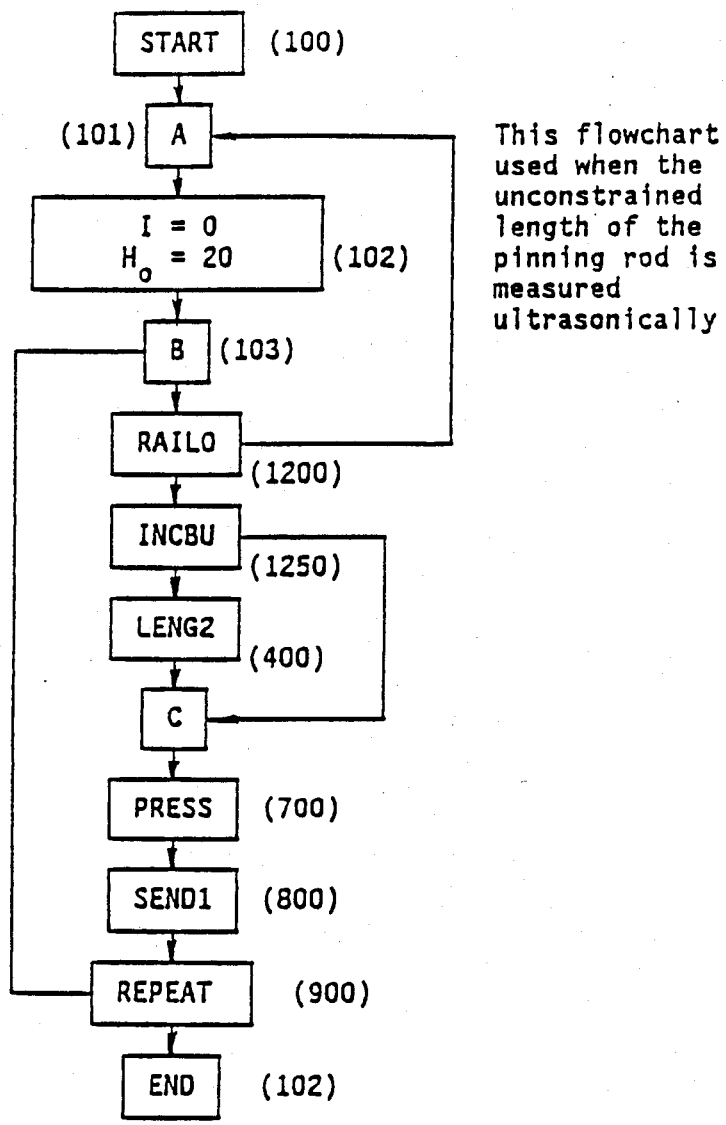
FIG. 10 is the flowchart for the main program for a roof bolting machine using ultrasonic distance measuring for determining the unconstrained length of the pinning rod.

Two main programs are set forth in FIGS. 9 and 10. The flow chart of FIG. 9 pertains to that embodiment of the invention which uses either contact switches or rotary encoders, with an optional proximity switch on the roof support, to record roof height. It includes a TRAM subroutine to retain the last roof height measurement only if the bolting machine has moved less than a prescribed amount (perhaps 3 feet) since the last drilling operation.

The program of FIG. 10 applies only when the pinning rod length is measured ultrasonically. With this instrumentation the unconstrained length of the pinning rod is known as soon as the drilling process is begun. It is not necessary, therefore, to limit the distance the machine may be moved, or trammed, between drilling operations.

Returning to FIG. 9, the program begins at START, step 100, when the machine is turned on. In step 102, initialization takes place. In this step, the iteration counter I is set to 1, and $H_o$ is set to 20 feet to assure that the bolting machine wi-1 begin at its minimum operating pressure. Control is then passed to TRAM, whose flowchart is given in FIG. 11.

Figure 11:
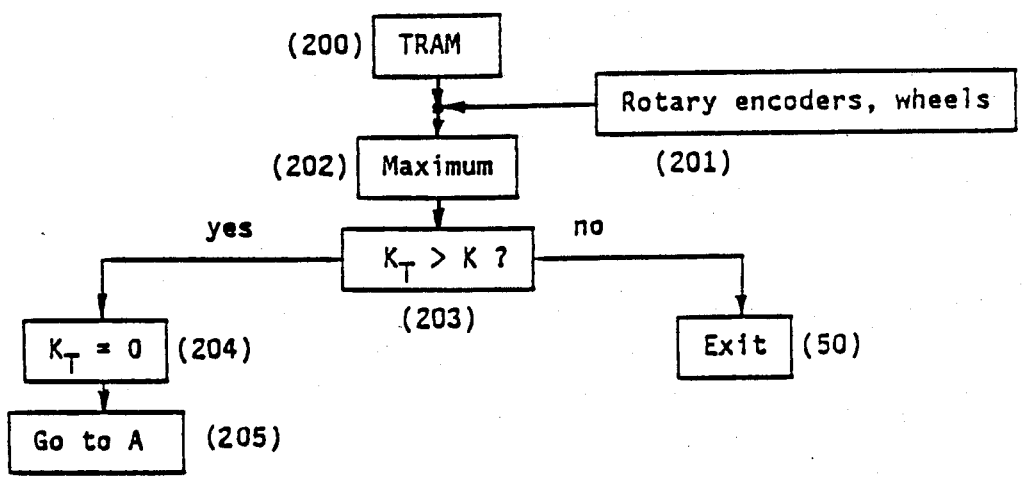
FIG. 11 is a flowchart of the subroutine TRAM used in the program of FIG. 9.
Figure 12:
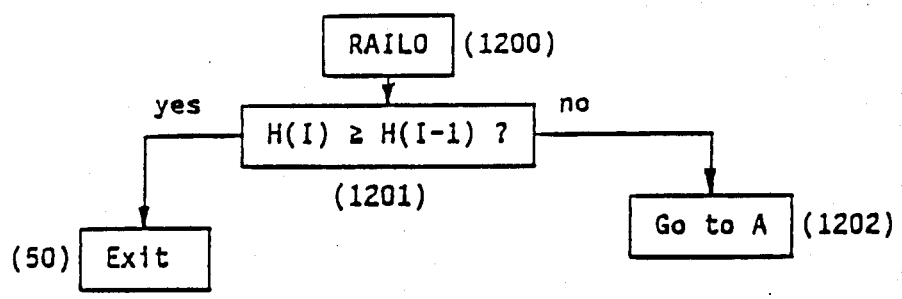
FIG. 12 is a flowchart of the subroutine RAILO used in the programs of FIGS. 9 and 10.

As shown in FIG. 11, TRAM receives a count from two rotary encoders shown in block 201. Each rotary encoder is attached to one vehicle wheel and may detect rotation of less than one revolution of the wheel to which it is attached. The larger of these two values ($K_T$) is selected in step 202 by the MAXIMUM routine, which is not flowcharted but which would be apparent to one of ordinary skill in the art. The MAXIMUM routine also sends the selected value $K_T$ to a comparison routine in step 203 to find if this value has exceeded a predetermined permissible value K. If it has, control is passed to step 204 which resets $K_T$ to zero and passes control to the "Go to A" step 205, which returns control to location A, step 101, in the main program. This causes the main program to set pressure to a minimum and set the iteration counter to zero since a new roof height may be necessary. Otherwise, control is passed to Exit, step 50, which sends control to the next subroutine, which is RAILO.

The function of RAILO, shown in FIG. 11, is to compare the present elevation H(I) of the torque motor with its last elevation H(I-1) in decision step to determine if the torque motor is being lowered. The program assumes that if it the torque motor is being lowered, the last pinning (drilling) operation has been terminated and control is returned to point A, step 101, of the main program, FIG. 8. Otherwise control is passed to Exit and then to INCBU in step 1250 in FIG. 8.

Figure 13:
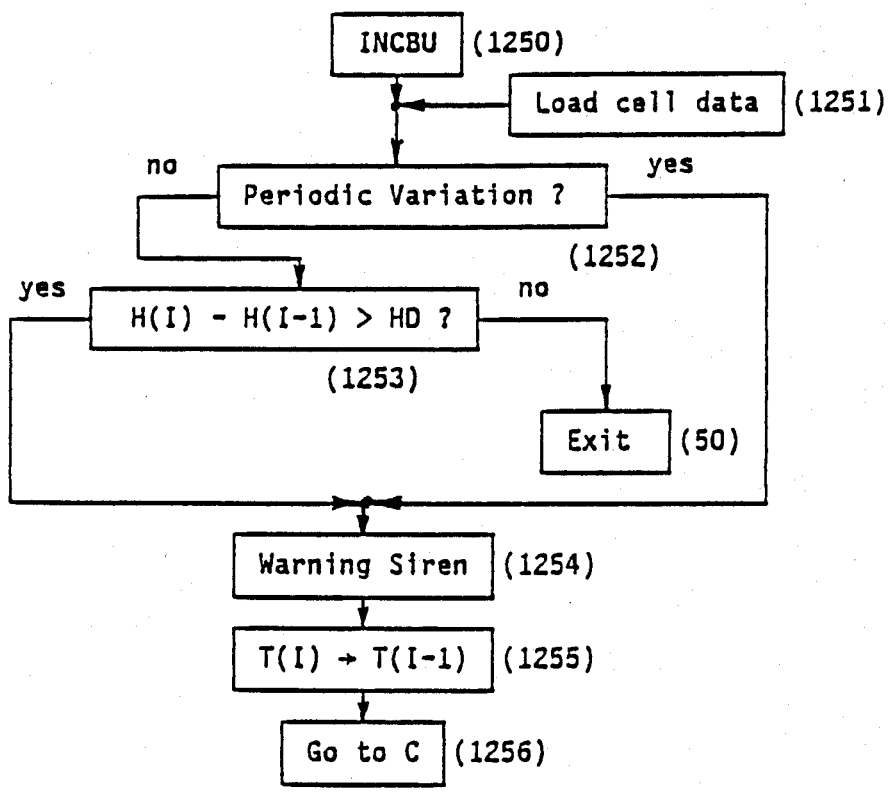
FIG. 13 is a flowchart of the subroutine INCBU used in the programs of FIGS. 9 and 10.

INCBU, shown in FIG. 13, is an optional check on incipient buckling using data received in step 1251 from
(a) load cells mounted on the torque motor mounts within the torque motor housing 14 as shown in FIG. 8, or
(b) load cells (not shown) mounted at the pivot points such as 17 in FIG. 1 or at all four pivots points where the twin booms are attached to the motor mount in FIG. 1.

As an alternative, incipient buckling can be determined from
- (c) a comparison of the returns from two or more ultrasonic transceivers mounted on or near the torque motor 14 in FIG. 1, or
- (d) from a comparison of the advanced velocity of the torque motor.

In FIG. 13, data from several load cells mounted as in (a) and (b) above is entered into memory for the last two cycles of the torque motor in step 1251. It is examined for periodicity in step 1252. (If three load cells are used, for example, each should show a load variation with a frequency 3 times that of the rotational frequency if a bent pinning rod were to exert a rotating moment on the torque motor but in a direction perpendicular to the axis of rotation of the motor shaft.) If a rotating moment is detected, a warning siren may be triggered in step 1254 and the thrust is reduced in step 1255 to that of the last iteration of the main program loop. If no rotating moment is detected, control is passed to step 1253.

The last two torque motor elevations are compared in step 1253. If their difference is greater than a preselected value, HD, a warning siren is activated as in step 1252, the thrust is reduced to its previous value, and control is passed to location C, step 104, in the main program. Otherwise INCBU performs a normal Exit, step 50, and control is passed to LENG1 in FIG. 9.

Figure 14:
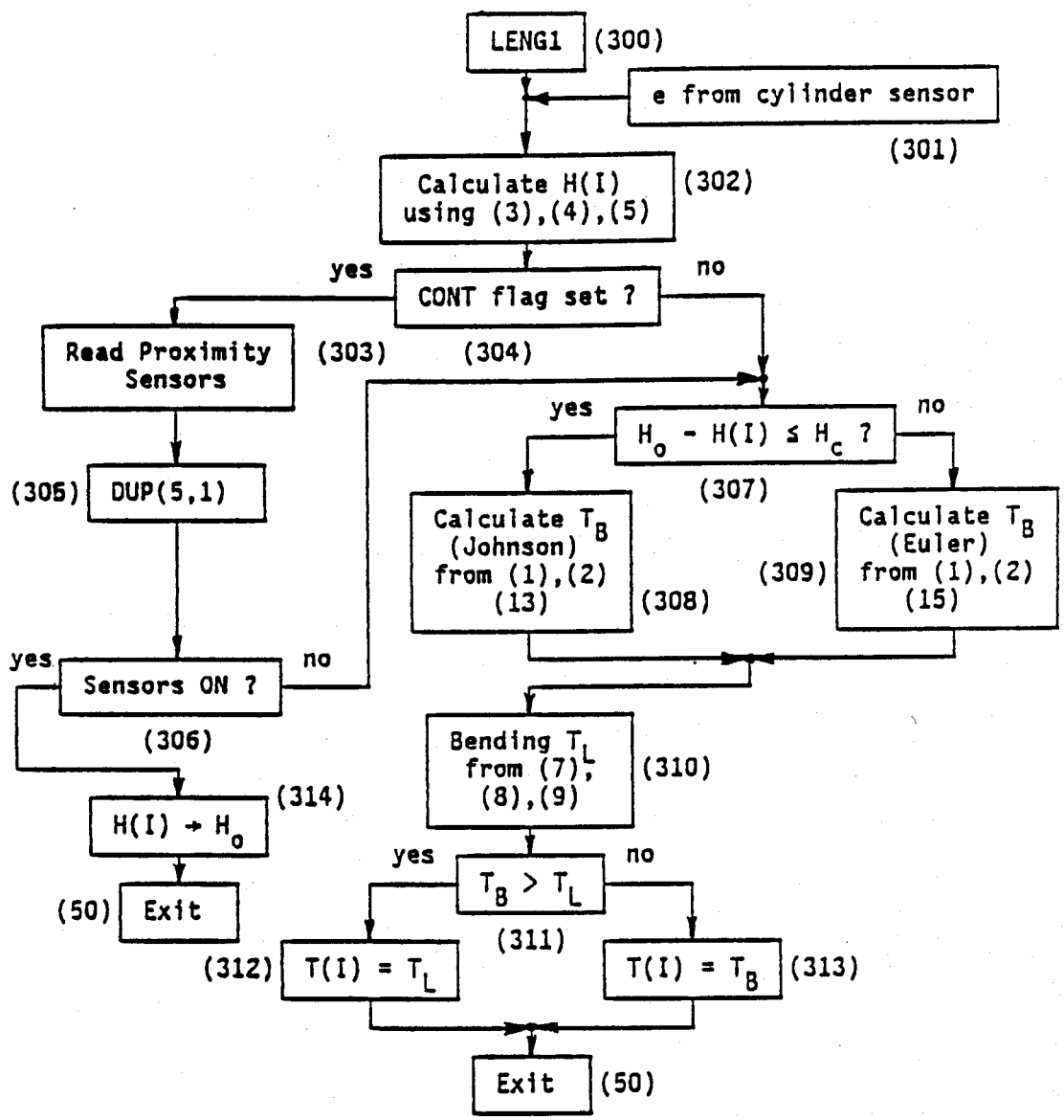
FIG. 14 is a flowchart of the subroutine LENG1 used in the programs of FIGS. 9 and 10.

LENG1, which is flowcharted in FIG. 14, is associated with Method 1, in which the invention is applied to a Lee-Norse type machine and the pinning rod length is to be found from the known roof height, recorded from the last drilling operation, and from the present elevation of the torque motor as calculated from the measured extension of thrust cylinder 12, FIG. 1. This data is supplied to LENG1 in step 301, FIG. 14. The present elevation of the torque motor is calculated in step 302 using equations 3, 4 and 5, described above relative to the explanation of Method 1.

The contact flag, CONT, is set whenever the contact switch 78 on the torque motor housing 14, FIG. 1, is depressed. When it is set, control is passed to step 303 which reads two optional proximity sensors 226 on the roof support frame 220, FIG. 6 and passes the data to step 305 where readings from both sensors are compared in a DUP routine (to be described below) and the output sent to step 306. If they indicate presence of the torque motor, the present motor elevation is recorded at the roof height in step 314 and the subroutine returns control to the main program.

If the proximity sensor option has not been installed, control from flag query 304 passes directly to step 314 when roof contact is indicated.

If roof contact has not been made, control is passed to step 307 where the present elevation of the torque motor is subtracted from the recorded roof height and the difference is compared with $H_c$. If the difference is larger than $H_c$, control passes to step 309 where the Euler buckling thrust is calculated. If it is equal to or less than $H_c$, control passes to step 308 where the Johnson buckling thrust is calculated. Control passes from either step 308 or step 309 to step 310 where the equations shown above are used to calculate the limiting pinning rod thrust as determined by the endurance stress for the pinning rod material. This thrust is compared with that obtained in either steps 308 or 309 and the smaller thrust is taken as the limiting thrust for pinning rod length $H_o$—H.

Figure 15:
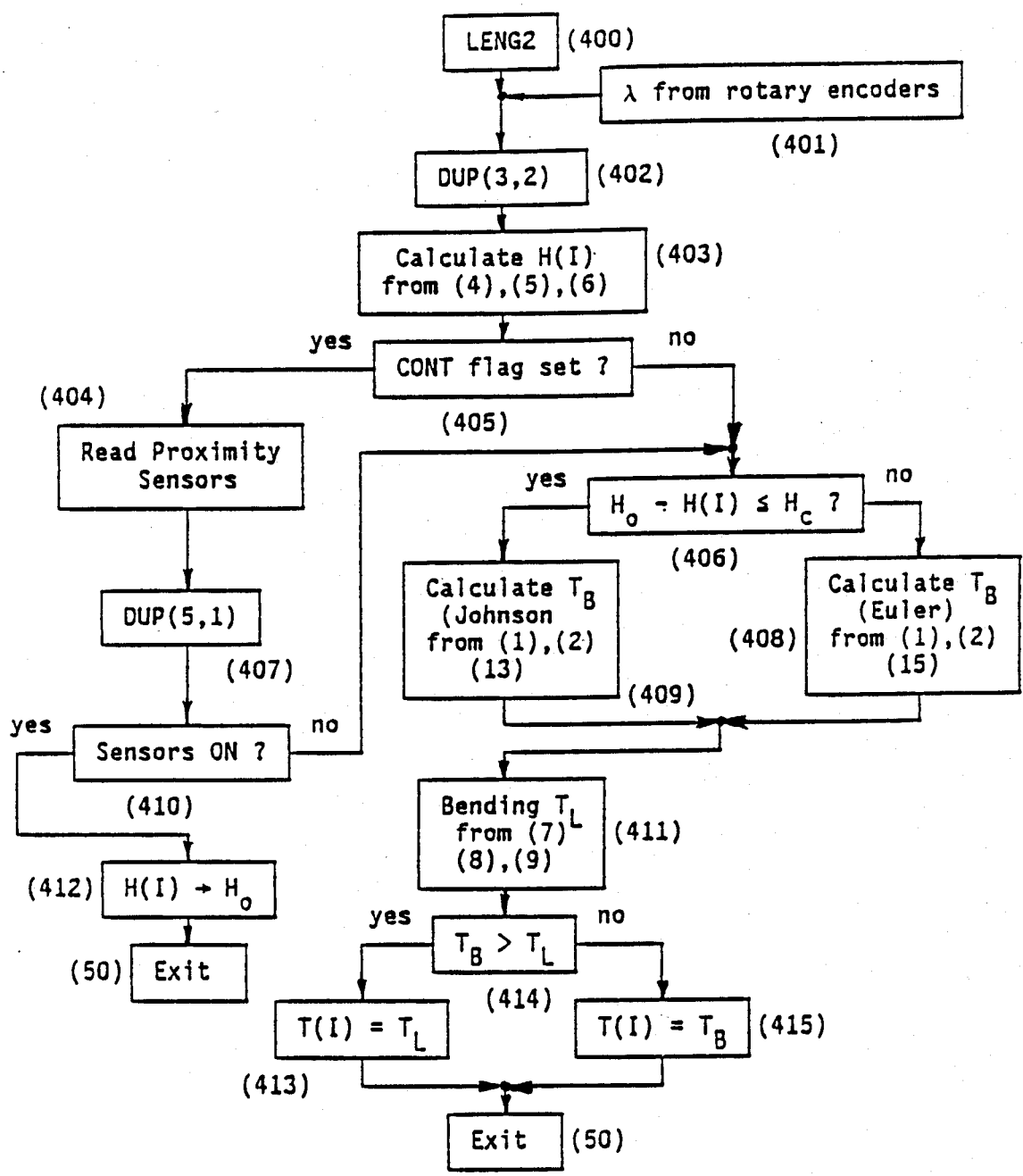
FIG. 15 is a flowchart of the subroutine LENG2 used in the program of FIGS. 9 and 10.

Use of rotary encoders mounted at pivots 26, one on each side of the bolting machine carriage of a Lee-Norse type machine, FIG. 1, instead of the instrumented thrust cylinder extension measurement as described in Method 2 requires that LENG1 be replaced by LENG2, FIG. 15. In this program, integer output from the rotary encoders is received in step 401 which is examined by the DUP routine (to be described below) in step 402 to assure that the difference between the encoder data is less than a specified value. If is not, the automatic anti-buckling device is deactivated in the DUP routine, the operator is warned, and either the machine is stopped or permitted to continue only under manual control, as decided by the mine owner.

If the encoder data are within an acceptable error limit, control is passed to step 403 where the torque motor height is calculated using formulas (4), (5) and (6), described above. Control then moves to step 405 where the CONT switch is interrogated. Steps 404, 407, 410, 412 and 50, which correspond to steps 303, 305, 306, 314, and 50 of FIG. 14, are then followed, as described in the discussion of LENG1, if contact with the roof has been indicated. Otherwise control passes to step 406 where the exposed rod length, which is equal to $H_o$—$H(I)$, is compared with Hc and either steps 408 or 409 are called to calculate the limiting buckling thrust. The $T_L$ is calculated in step 411 and compared with the output from either 407 or 408 in step 414. Again T(I) is set equal to the smaller value and the program exits to the main program.

Figure 16:
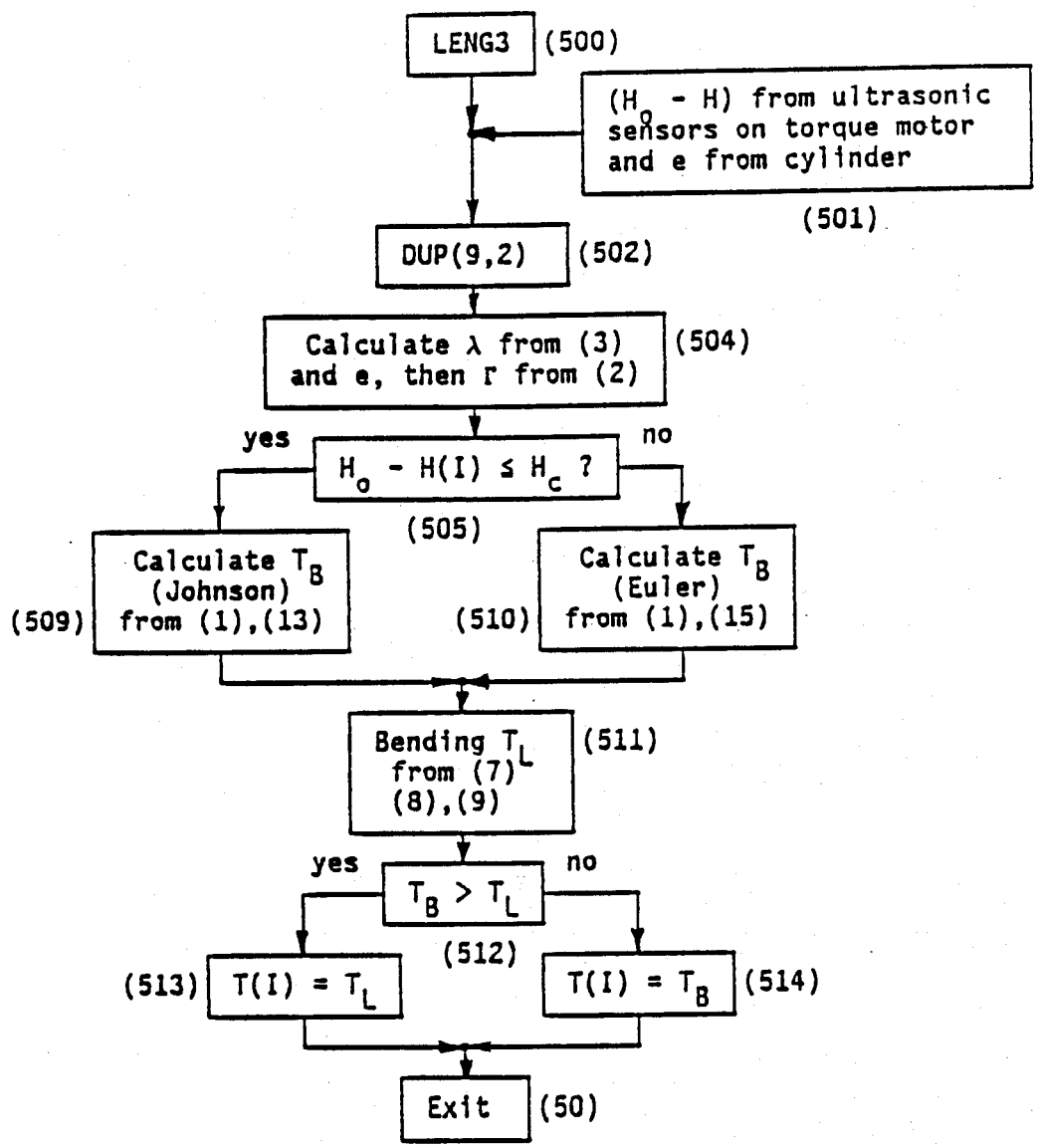
FIG. 16 is a flowchart of the subroutine LENG3 used in the programs of FIGS. 9 and 10.

LENG3, FIG. 16, is to replace LENG1 in the main program when Method 3 is used in which this invention is applied to a Lee-Norse type bolting machine in which the extension measurement within the thrust cylinder is supplemented by one or more ultrasonic transceivers on the torque motor housing or in the immediate vicinity thereof. Rod extension and analog data from the transceivers are received in step 501. The distances measurements for $H_o$—H are examined by the DUP routine (to be described below) to determine whether the difference between the received values is small enough for the data to be acceptable. If it is, a single value for $H_o$—H is sent to step 504 along with the value of rod extension e. As noted in step 504, Γ and λ are calculated from equations (2) and (3) and $H_c$ is calculated, or recalled from memory, preparatory for the comparison in step 505 which determines whether the thrust will be calculated by step 509 or 510. As before, the maximum thrust allowed by the endurance stress of the pinning rod is found in step 511 and the smaller of the calculated thrust values is set equal to T(I) in steps 513 or 514, depending upon the outcome of the comparison made in step 512. Control is then returned to the main program and then to subroutine PRESS.

Figure 17:
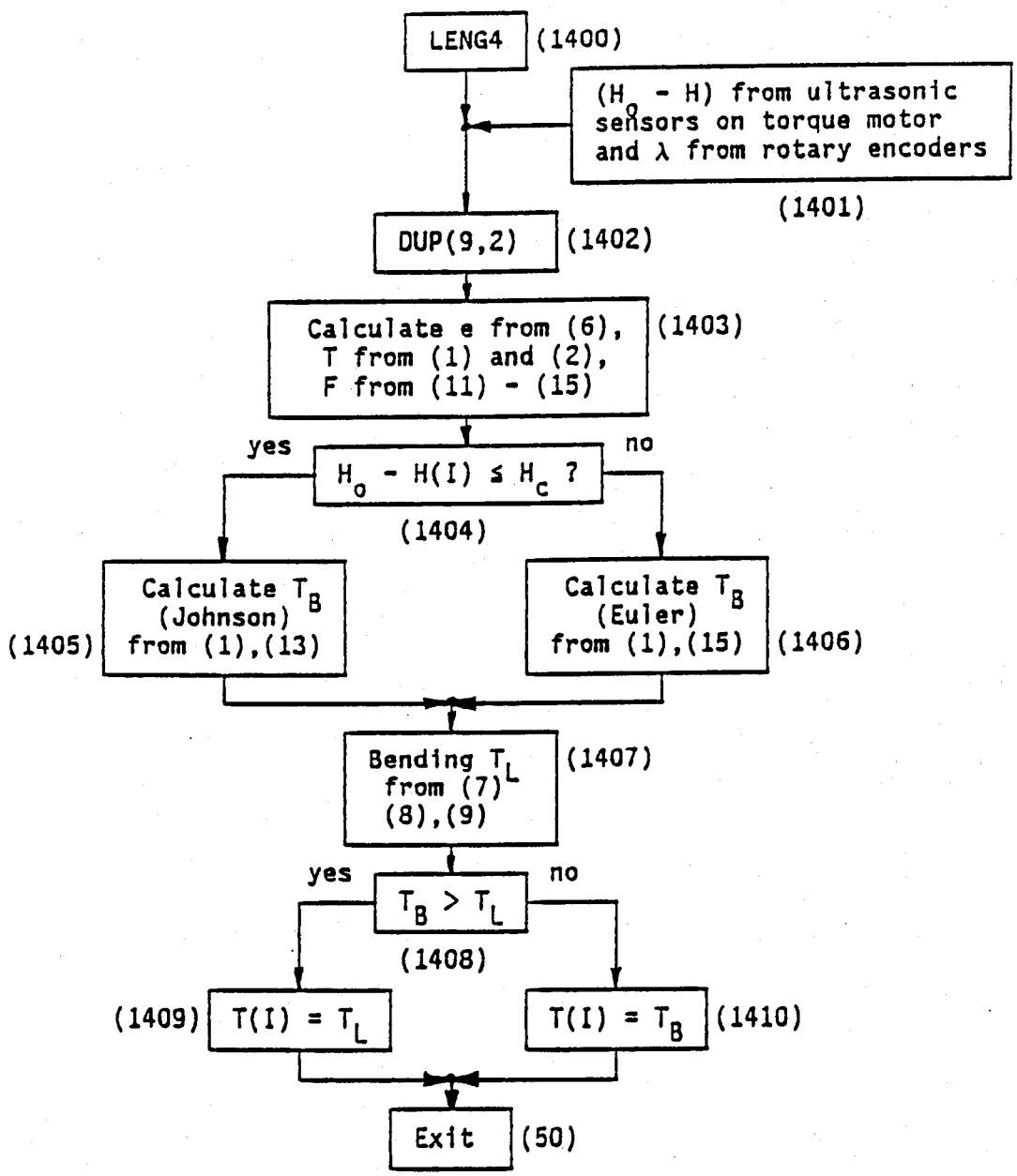
FIG. 17 is a flowchart of the subroutine LENG4 used in the programs of FIGS. 9 and 10.

LENG4, FIG. 17, describes that program that replaces LENG1 when Method 4 is applied to a Lee-Norse type bolting machine in which the torque motor elevation is found from rotary encoders rather than from a measurement of the thrust rod extension. Pinning rod length is again measured ultrasonically. As is evident from FIGS. 16 and 17, the two differ only in the formulas used to calculate required thrust in cylinder 12, FIG. 1, to provide the maximum force according to equations (11) through (15).

Figure 18:
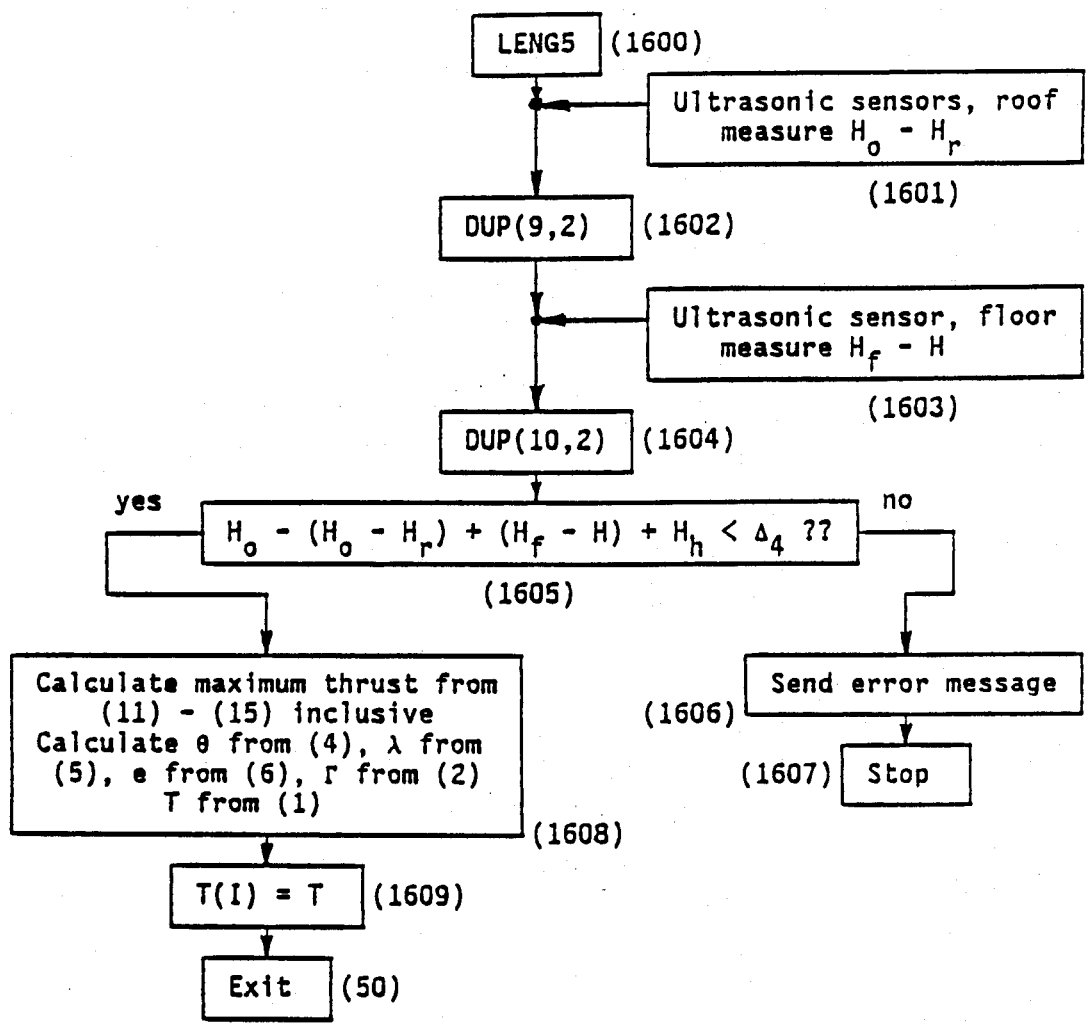
FIG. 18 is a flowchart of the subroutine LENG5 used in the programs of FIGS. 9 and 10.

LENG5, charted in FIG. 18, replaces LENG1 when Method 5 is used with a Lee-Norse type machine in which a second set of ultrasonic sensors is affixed to the torque motor housing 14 in FIG. 1 to read distance to the floor. Data from the upward aimed sensors are entered in step 1601 and data from the downward looking sensors is entered in step 1603. After both entries are checked by DUP in steps 1602 and 1604 the resulting values are added along with the difference in elevation of the sensor faces (detector surfaces) to compare present roof height with the last several roof heights in step 1605. If the difference is less than $\Delta_4$ the sensors are assumed to be functioning satisfactorily and the roof height is assumed to have changed little. Hence, the thrust limit is calculated in step 1608, set equal to T(I) in step 1609, and control returned to the main program by means of Exit 50.

If roof differences exceed $\Delta_4$, a warning message is sent in step 1604 and the bolter may be stopped at step 1605. If the operator finds that the change in measured height corresponds to an actual change in height he may restart the automatic pressure control mode, which begins at START in the main program.

Figure 19:
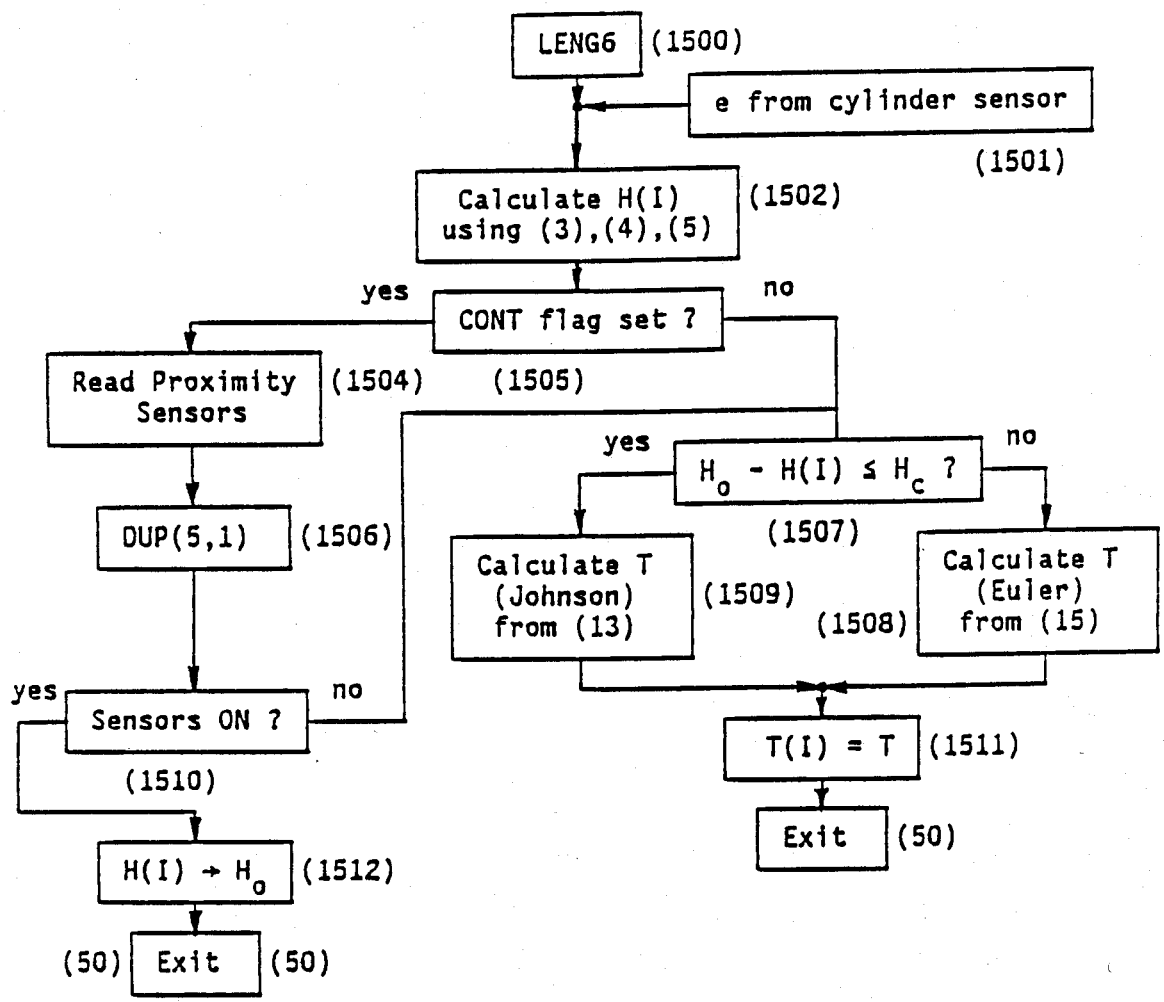
FIG. 19 is a flowchart of the subroutine LENG6 used in the programs of FIGS. 9 and 10.

LENG6 corresponds to Method 6 and replaces LENG1 whenever the torque motor elevation on a Fletcher machine with a standard rod and piston thrust cylinder is measured with the device used in Method 1 and roof contact is found from contact switch 78, FIG. 1. Handling of data from the contact switch is similar to that described in Method 1 as shown in FIG. 19, steps 1505, 1504, 1506, 1510, and 1512. The thrust calculation follows directly from the test in step 1507 and the formulas shown in steps 1509 and 1508. T(I) is given the value of T from either steps 1505 or 1508 by step 1511.

Figure 20:
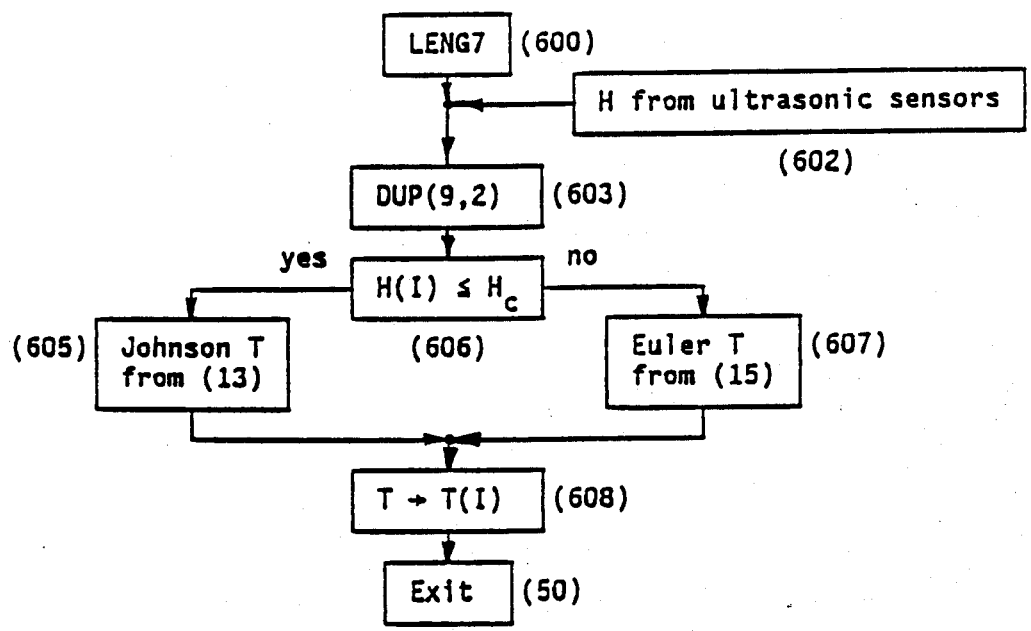
FIG. 20 is a flowchart of the subroutine LENG7 used in the programs of FIGS. 9 and 10.
Figure 21:
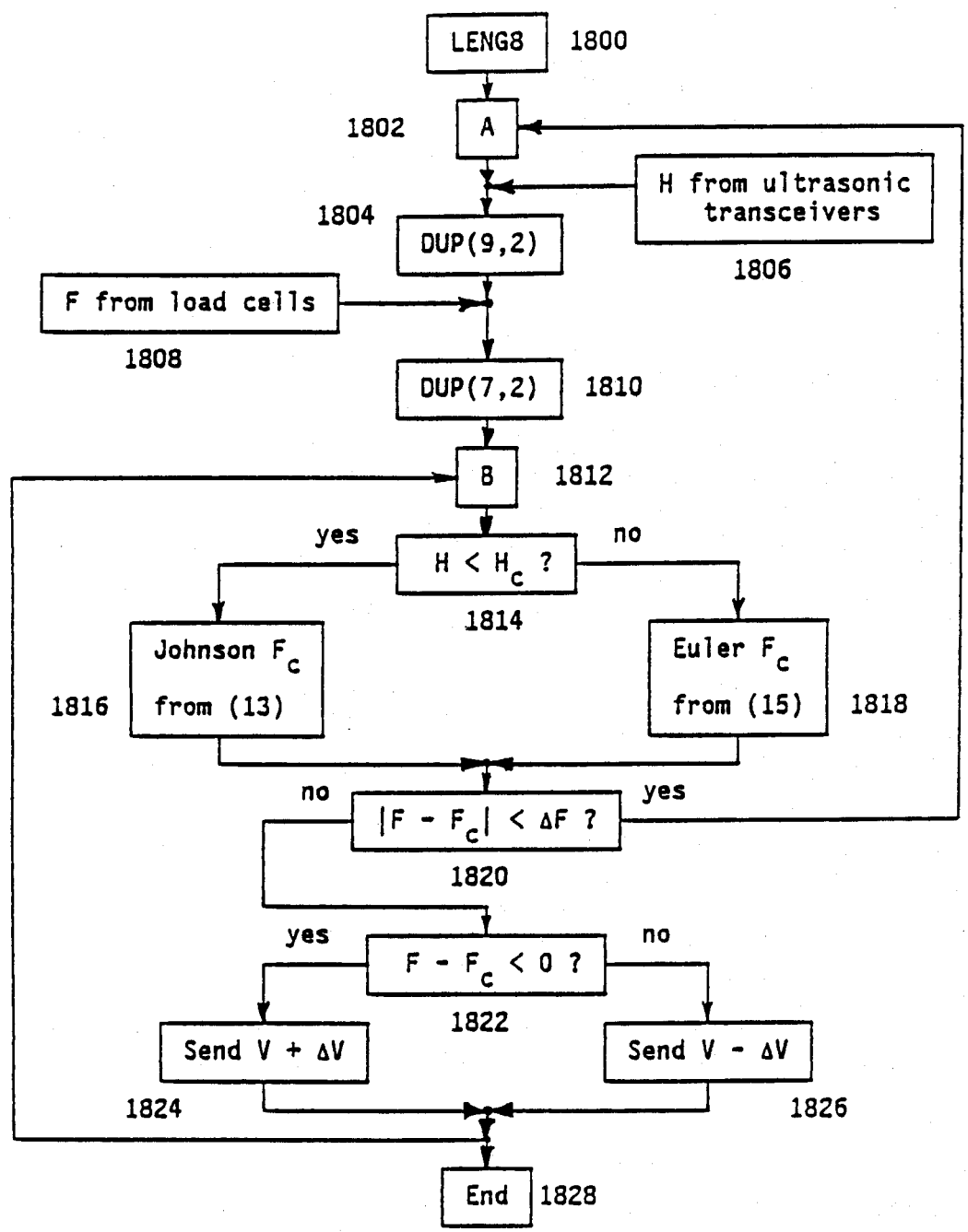
FIG. 21 is the flowchart of the subroutine LENG8 used in the programs of FIGS. 9 and 10.

LENG7, which is flowcharted in FIG. 20, is associated with Method 7. It is to be used in place of LENG1 with a Fletcher type machine having ultrasonic sensors mounted on the torque motor housing as shown in FIG. 7(a). These sensors measure the distance from the torque motor to the roof, $H_o$—H, which is the unconstrained length of the pinning rod. Data from these sensors is entered into the program in step 602 and is examined by DUP in step 603 for acceptability. Again $H_c$ is either calculated or recalled from memory and compared in step 606 with the value of $H_o$—H sent from DUP. As before, the magnitude of $H_o$—H relative to $H_c$ determines whether T is calculated in step 605 or 607. The result from either of these calculations is set equal to T(I) in step 608 and command returned to the main program.

LENG8, as shown in the flowchart in FIG. 20, involves no pressure sensor input or calculation of the effect of linkage position. Length of the unconstrained length of the pinning rod is entered from the ultrasonic transceivers and a computer program in box 1806. If duplicate values are entered they are compared by the DUP routine already described in step 1804. Force is entered from the load cells and a short computer program in box 1808 and, if duplicate value are entered, they are compared by the DUP routine in step 1810. The value of H reaching point B, box 1812, is compared with criterion $H_c$ computed from equation (11) in step 1814 and the limiting torque is then calculated from equation (13) in step 1816 if H is less than $H_c$ and from equation (15) if H is equal to or greater than $H_c$ as shown in step 1818. If the resulting value is within $\Delta F$ of the measured value no pressure commands are given and control is returned to A, box 1802 in FIG. 20. If the measured force F is less than the calculated force $F_c$ the pressure is increased by an amount $\Delta P$ corresponding to command voltage increase of $\Delta V$ as shown in step 1824; if F is greater than $F_c$ the pressure is decreased by an amount $\Delta P$ corresponding to a command voltage decreased of $\Delta V$ as shown in step 1826.

Replacement of 1824 and 1826 by either SEND1 or SEND2 may provide a somewhat improved response at the expense of pressure measurements.

Figure 22:
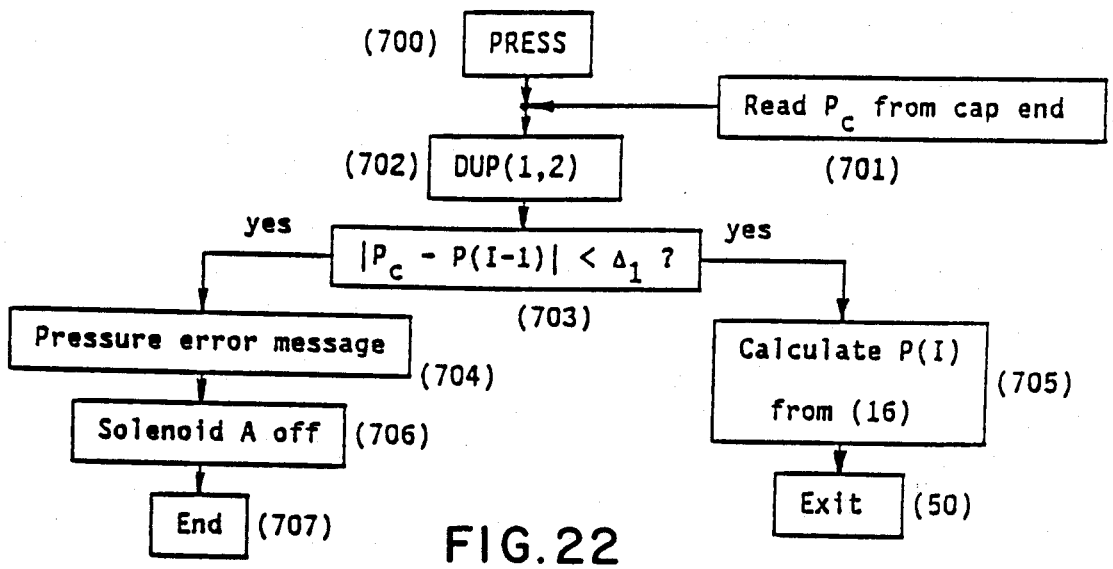
FIG. 22 is a flowchart of the subroutine PRESS used in the programs of FIGS. 9 and 10.

After LENG1, LENG2, LENG3, LENG4, LENG5, LENG6, or LENG7 is completed the resulting thrust value T(I) is sent to PRESS, charted in FIG. 22. Before processing the information, the present pressure $P_c$ at the cylinder cap end is read from two (redundant) pressure transducers (42 and 74 in FIG. 5) at the cap and entered in step 701. The two pressure readings are processed by DUP and an average value $P_c$ is sent to step 703 where it is compared with the last pressure P(I-1) commanded by SEND1. If the difference between these pressures is less than $\Delta_1$, which was recalled from memory, the commanded values and the measured values are in satisfactory agreement and control is passed to step 705 which then calculates the required cap pressure from equation 16. Control is passed to Exit which returns to the main program to be passed to SEND1.

If the difference between the average measured pressure and the last desired pressure is larger than $\Delta_1$ control is sent to step 704 which either sounds an alarm, illuminates a warning light, or both, and disconnects the power to solenoid A, component 47, FIG. 5, and terminates the anti-buckling control of the machine. With solenoid A off, the operator must move to manual control valve 46, FIG. 5. This is but one response that may be programmed. Another is to shut off the hydraulic pump and halt roof drilling entirely.

Figure 23:
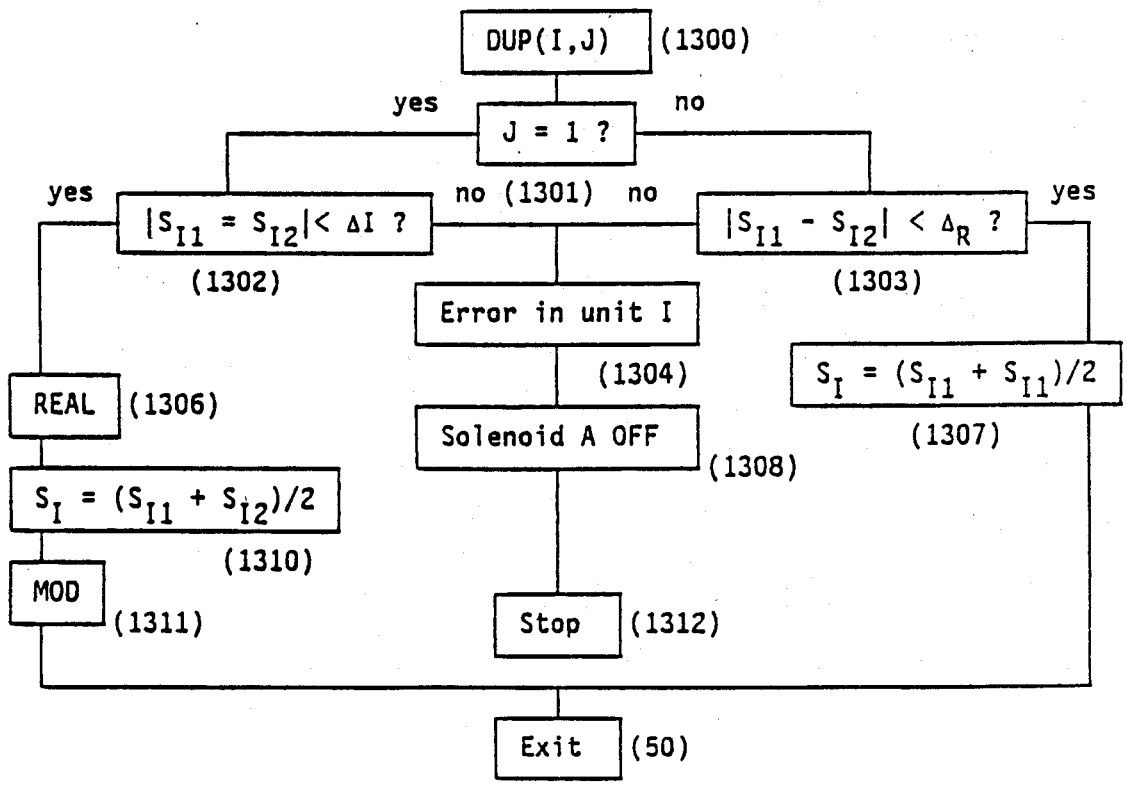
FIG. 23 is a flowchart of the subroutine DUP used in the programs of FIGS. 14-20.

The DUP routine which has been called by some of the other subroutines is shown in FIG. 23. This routine is carried out based on the indices I and J in the argument.

The index I indicates the sensor output being received. The following are possible values for index I:
1. indicates the pressure sensor in the cap end of the thrust cylinder.
2. indicates the pressure sensor in the head end of the thrust cylinder.
3. indicates the rotary encoder on the thrust boom.
4. indicates the rotary encoder on the roof support.
5. indicates the roof proximity sensor.
6. indicates the tram sensor rotary encoder.
7. indicates the torque motor incipient buckling sensors.
8. indicates the roof contact switch.
9. indicates the ultrasonic transceivers aimed at the roof.
10. indicates the ultrasonic transceivers aimed at the floor.

The J index in the argument list for the subroutine indicates whether the values to be examined are integer or real; i.e., 2 or 2.4. If J is a 1, the values to be examined are integer. If J is a 2, this indicates that the values to be examined are real. When J is a 1, the outputs being received indicate either an ON state or an OFF state. A digital value of 0 indicates OFF and a digital value of 1 indicates ON. When J is a 2, the output being received is an analog or digital numerical output.

Analog values are not compared before passing through an analog-to-digital converter. The distinction between integer and real numbers is an important consideration in the programming of many microprocessors because of the additional chip that may be required to handle real, or floating-point, numbers. This distinction is made at step 1301.

If the values to be compared are not within the limits $\Delta_r$ or $\Delta_i$ stored in memory, the data is rejected in steps 1302 or 1303, an error message is displayed in step 1304, and solenoid A, part 47 in FIG. 5, is turned off in step 1308, under the assumption that one of the sensors or transducers is defective. The consequences of turning solenoid A off have been given in the previous paragraph. As written in FIG. 23, the program is also stopped in step 1312 after power is removed from solenoid A. Other options are, of course, available.

If control is passed to step 1302 from decision step 1301, the integers are changed to reals in step 1306 using program REAL (not shown) before taking the average. The result is again converted to the nearest integer using MOD, step 1311, and the control then returns to the calling routine via the Exit command, 50. If, on the other hand, control is passed from decision, or branch, 1301 to 1303, which is already written in floating-point arithmetic, the average is taken immediately and passed to Exit for return to the calling program or subroutine.

No flowcharts have been displayed for routines REAL and MOD because they are well known to those familiar with programming, especially for engineering applications.

Figure 24:
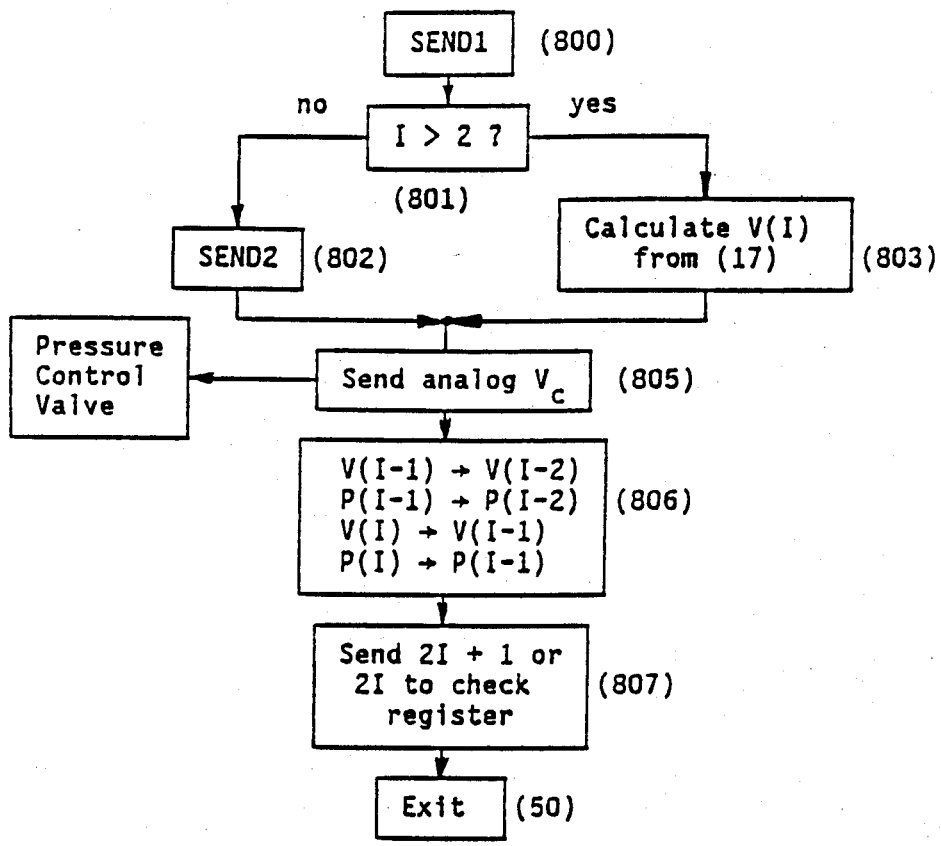
FIG. 24 is a flowchart of the subroutine SEND1 used in the programs of FIGS. 9 and 10.

The pressure calculated in PRESS, FIG. 22, is converted into a control voltage in subroutine SEND1 which first checks the iteration count I in step 801 in FIG. 24. If I is equal to or less than 2, insufficient data is available to self-calibrate the pressure control valve by using previous voltage commands and the resulting pressures to calculate the next voltage required. Thus, when I is not greater than 2, control is passed to SEND2, step 802, to use previously recorded end point voltages and pressures at the upper and lower ends of the linear portion of the pressure versus voltage control curve for the Towler valve to be used for pressure control. (The Towler valve is of German manufacture and is marketed in the United States by Parker-Hannifin.)

When I is greater than 2, control passes to step 803 which uses equation 17 in which symbols P(I) and V(I) denote the cap pressure desired and the command voltage required at iteration step I. Cap pressure P(I) has also been designated as $P_c$ when the step at which the pressure was calculated was not emphasized. The command voltage is sent to the pressure control valve as soon as the calculation using either equation (17) or SEND2 is completed. When calculated by the active computer both P(I) and V(I) are also stored in the dual-port memory, 69 in FIG. 5, in those registers to be read by the passive microprocessor. When calculated by the passive computer they are also stored in the dualport memory in those registers to be read by the active microprocessor.

After the command voltage is sent from step 805 to the pressure control valve, the values of pressure and voltage in memory are shifted in step 806; the voltage and pressure in the registers for I-1 data are shifted to those for I-2 data and the I values just calculated are shifted to the I-I registers in preparation for the next calculation.

It is in this subroutine where the programs of the active microprocessor 67 and passive microprocessor 68 of FIG. 5 differ. The SEND1 routine on the active computer has step 805 in which a command is sent to the control valve while this step is missing from the SEND1 routine written for the passive computer. A second difference is in step 807 in which the active microprocessor sends integer 2I+1 to the check register to be read by the passive micro in the dual-memory chip, component 69 in FIG. 5, while the passive microprocessor 68 sends integer 2I to the check register to be read by the active micro.

Figure 25:
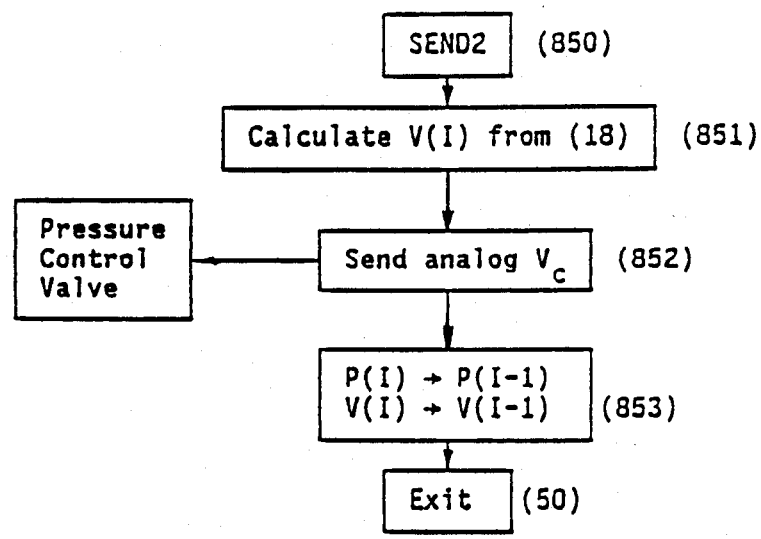
FIG. 25 is a flowchart of the subroutine SEND2 used in the programs of FIGS. 9 and 10.

Routine SEND2 is shown in FIG. 25. Equation (18) is used to calculate the first two values of V(I) and from pressures labeled P(I); i.e. when the bolting machine is turned on I=1 for the first calculation and the pressure found from PRESS is denoted by P(1) and is used to find V(1) from equation 18. After a voltage of magnitude V(1) is . sent in step 852 to the pressure control valve, both P(1) and V(1) are stored in the appropriate I-2 locations in step 853 and the subroutine exits to the main program. In the next iteration P(2) and V(2) will be calculated, a voltage of magnitude V(2) will be sent to the pressure control valve and these values will be stored in the appropriate I-1 locations in step 853, FIG. 25.

On the next iteration I=3, program control will remain in SEND1, and the voltage V(3) will be calculated from equation 17 instead of equation 18 and P(2) and V(2) will be recalled from the I-1 registers and P (1) and V(1) from the I-2 registers. Storage will now be performed in step 806, FIG. 24, in the SEND1 subroutine, where V(3) and P(3) will be stored in the I-1 locations, V(2) and P(2) will be stored in the I-2 locations, and V(1) and P(1) will be discarded. SEND1 will calculate and send all succeeding voltages V(I) in step 805 and store all V(I) and P(I) in step 806 until the boom is lowered and the iteration counter is reset to 1 in step 101 of the main program.

Since two microprocessors are involved for redundancy, but only one control valve, several techniques are available to supply the single command voltage required. Three of these possibilities are:

1. having the command delivery alternate between microprocessors with the passive micro checking the active micro,
2. having both computers send a command to a circuit which sends the average of the input signals it receives, and
3. having one microprocessor always send the voltage controlling the pressure and the other always checking.

The third possibility is preferred but the other two can also be used.

The first may be implemented in a manner similar to that used in possibility 3 except that a single check register would be used. The first micro would send a command only if it found integer 2 in the check register and would leave a 1 after the command was sent. The second micro would send a command only if it found a 1 in the check register and would leave a 2 after the command was sent.

The second possibility requires only a simple state-of-the-art averaging circuit which would not be duplicated. Its reliability would be similar to that of the single extension measuring device in the thrust cylinder.

Figure 26:
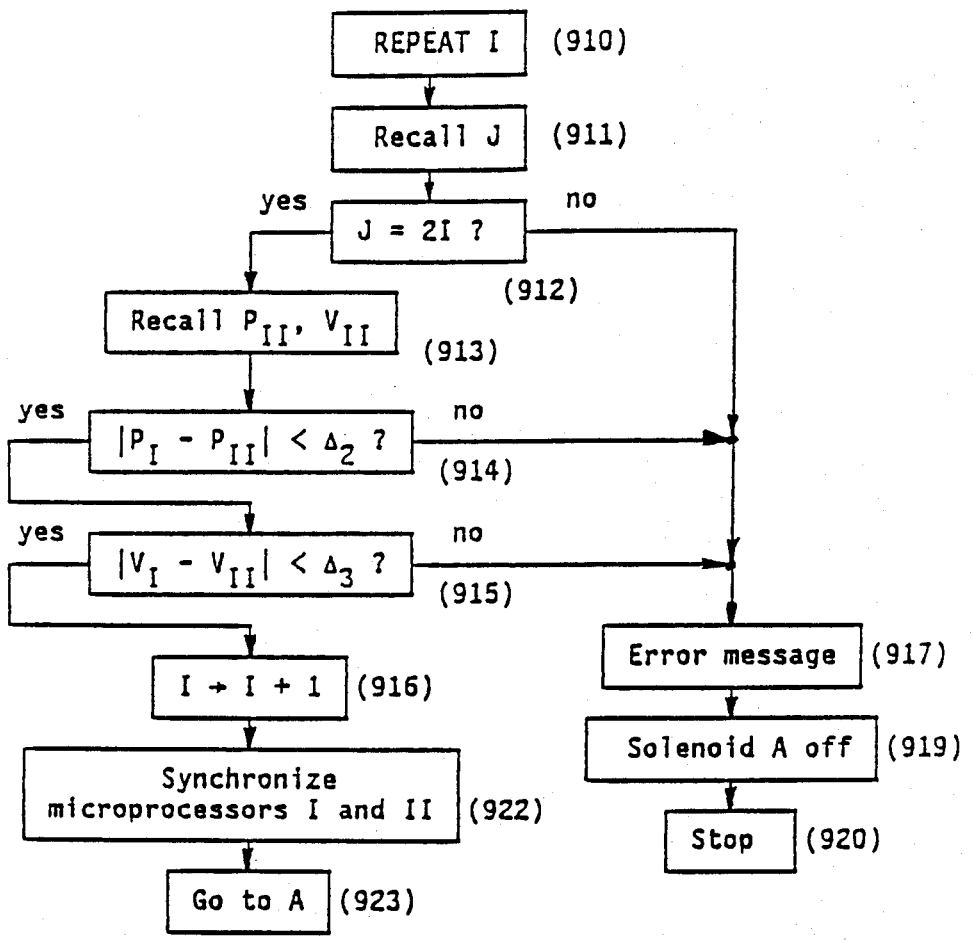
FIG. 26 is a flowchart of the subroutine REPEAT I used in the programs of FIGS. 9 and 10.
Figure 27:
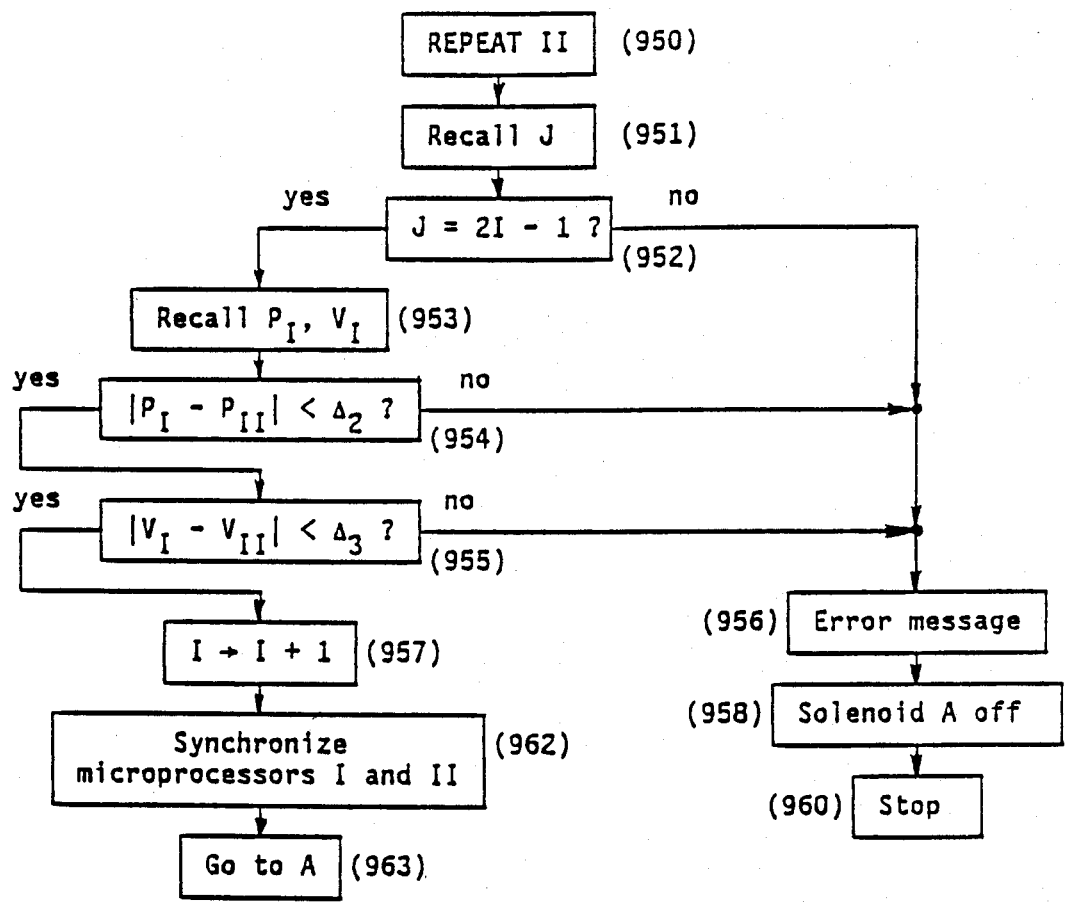
FIG. 27 is a flowchart of the subroutine REPEAT II used in the programs of FIGS. 9 and 10.

REPEAT I represents the flowchart for a subroutine on the active microprocessor in the third possibility. Its flowchart, shown in FIG. 26, is identical to that of the passive microprocessor except for step 912 in FIG. 26 and step 952 in FIG. 27 and for step 918 in FIG. 26 and step 959 in FIG. 27. It is in this subroutine where the calculations from the two microprocessors are compared to check for microprocessor malfunction.

Both of the microprocessors have access to a dual-port memory chip to store and recall an order number J from a particular memory location, or register, which will be called the check register.

The program is designed for each computer to check on the other. Micros 67 and 68 alternately place numbers in the check register, with the active microprocessor 67 always storing an odd number, 2I+1, and the passive microprocessor 68 always storing an even number, 2I, after completion of the SEND1 subroutine by each micro.

When control and the iteration count I is received by this subroutine, step 910, FIG. 26, the subroutine in active computer recalls J from the dual-port memory chip, 69 in FIG. 5, and checks to find if it equals 2I. If it does not find that value, it sends an error message in step 917, turns off solenoid A in step 919, and stops the program of both microprocessors.

If the integer recalled from the passive check memory location does equal 2I, that is taken to mean that the passive computer is functioning properly. A further check is to recall the last P(I) and V(I) computed by the passive computer, denoted by $P_{II}$ and $V_{II}$, respectively, and compare them with the last values of P(I) and V(I) computed by the active microprocessor, denoted by $P_I$ and $V_I$, in steps 914 and 915. If these values differ by less than $\Delta_2$ and $\Delta_3$, respectively, it is assumed that both microprocessors are functioning properly. Hence, counter I is increased to I+1 in step 916, the timing pulses in each microprocessor are synchronized in step 922, and control is returned in step 923 to START, step 101, FIGS. 9 and 10. Errors greater than either $\Delta_2$ or $\Delta_3$ in steps 914 or 915 will also produce an error message and halt the automatic control program and, if desired, the entire bolting machine.

REPEAT II is the subroutine written for the passive microprocessor. When it recalls an integer from the active check register it expects to find 2I+1. If it does not find the value, it also sends an error message, shuts of solenoid A, and stops the program. If it does find 2I+1, it recalls the P(I) and V(I) calculated by the active machine and in steps 954, 955, 957, 962 and 963 follows a program similar to that described for the active micro.

In the discussion of the program to this point all of the variables to be determined from the measurements of the various sensors have been calculated in the microprocessors from the formulas listed. This invention also includes programs in which all of the variables are stored in tables which were calculated from the formulas given and stored in memory so that only an interpolation routine would be necessary to select the appropriate values. Differing conditions and differing microprocessor designs may make either preferred for a particular application.

The foregoing discussion is set forth for the purpose of illustrating the present invention, but is not intended to limit the invention. Clearly, numerous additions, substitutions and other changes could be made to the invention without departing from the scope thereof, as set forth in the appended claims.

What is claimed is:

1. An apparatus, comprising:
   a mine shaft roof bolting machine for drilling holes into a mine shaft roof, said bolting machine comprising a torque motor, means capable of holding an elongated implement for rotation by said torque motor, and means for applying an upward thrust to said torque motor and elongated implement; and
   means for operating said applying means comprising:
   means for determining the length of said elongated implement exposed below said mine roof comprising at least one ultrasonic transceiver mounted for movement with said torque motor for directly measuring the distance between said torque motor and said mine roof through a signal reflected off said mine roof;
   means responsive to said length determining means for calculating a maximum thrust that can be applied to an unconstrained length of said elongated implement between the mine roof and the torque motor of the bolting machine without causing a buckling failure of said elongated implement; and
   means responsive to said calculating means for controlling said applying means to maintain said upward thrust at a level at least as low as said maximum thrust.

2. An apparatus as set forth in claim 1 wherein said determining means comprises means for measuring the height of said mine roof.

3. An apparatus as set forth in claim 2 wherein said measuring means comprises means for sensing contact of a predetermined positional relationship between said torque motor and said mine roof, and means for storing an indication of the elevation of said torque motor when said contact is sensed.

4. An apparatus as claimed in claim 3 including a roof support frame and at least one proximity sensor on the roof support frame to confirm the presence of the torque motor indicated by said contact sensing means.

5. An apparatus as set forth in claim 2 wherein said means for applying an upward thrust to said torque motor comprises a hydraulic cylinder.

6. An apparatus as set forth in claim 5 wherein cylinder includes a piston rod and said determining means comprises means for measuring the extension of the piston rod of said hydraulic cylinder.

7. An apparatus as set forth in claim 1 wherein said operating means comprises a programmed computer.

8. An apparatus as set forth in claim 1 wherein said calculating means comprises means for calculating an Euler-type equation when said exposed length is greater that a predetermined value and for calculating a Johnson type equation when said exposed length is less than said predetermined value.

9. An apparatus as set forth in claim 1 wherein said applying means comprises a solenoid operating valve.

10. The apparatus of claim 1 including at least two ultrasonic transceivers positioned on opposite sides of said elongated implement to detect a deviation of the axis of the elongated implement from an axis near and parallel to the direction of a beam pattern from said transceivers, which is a magnitude of the ultrasonic power as a function of the angle from the center line of the transceiver, of said at least two ultrasonic transceivers.

11. An apparatus as claimed in claim 1 wherein said mine shaft roof bolting machine comprises a Scott-Russell mechanism having links with pivot points and further includes rotary encoders located at least one of the pivot points of the Scott-Russell mechanism to measure the link rotation for use by said determining means for determining the length of said elongated implement exposed below said mine roof.

12. An apparatus as claimed in claim 1 wherein said mine shaft roof bolting machine comprises a Lee-Norse mechanism having links with pivots, and further including rotary encoders at least one of said pivots to measure rotation at said at least one pivot, and wherein said determining means uses said rotation measurement received from the rotary encoders to calculate the position of the torque motor and uses the calculated position of the torque to determine the length of said elongated implement exposed below said mine roof.

13. An apparatus as claimed in claim 1 wherein said torque motor includes motor mounts and further including means for detecting the force on each mount transmitting a corresponding electrical signal to a said calculating means.

14. An apparatus as claimed in claim 13 wherein said calculating means uses the signal received from the motor mount force detecting means to detect a bending moment applied to the shaft of the torque motor by the elongated implement.

15. An apparatus as claimed in claim 14 wherein said calculating means adjusts said maximum based on said detected bending moment.

16. An apparatus as claimed in claim 15 wherein said calculating means comprises two microprocessors, a dual-port memory chip, and a program for obtaining performance checks between the microprocessors.

17. An apparatus as claimed in claim 1 wherein said mine shaft roof bolting machine applying means comprises a linkage and a thrust cylinder for moving said torque motor, and wherein said calculating means comprises a computer with a computer program to account for the mechanical and geometrical effects of said linkage upon the relation between the thrust supplied by the thrust cylinder and the axial force applied to the elongated implement through the torque motor and the linkage.

18. An apparatus as claimed in claim 1 wherein said calculating means comprises a computer and a program to calculate the maximum force that may be applied to said elongated implement while rotating when an axial force and a bending moment act on the elongated implement simultaneously, based upon the material, physical characteristics, and endurance limit of said elongated implement.

19. An apparatus as claimed in claim 1 wherein said mine roof bolting machine applying means includes a mechanism having a thrust cylinder and a linkage which move said thrust motor upward through an inherently curved path and said calculating means comprises a computer and a program to account for the curved path followed by the torque motor when raised by said mechanism to limit the upward force applied to the elongated implement by the torque, linkage and thrust cylinder.

20. An apparatus as claimed in claim 1 wherein said mine roof bolting machine applying means includes a mechanism having a thrust cylinder and a linkage which move said thrust motor upward and wherein said calculating means comprises a computer and a program which calculates the deviation of the torque motor from the original axis of the elongated implement as the motor is raised by said linkage, said deviation being calculated as a function of the torque motor elevation above a reference point.

21. An apparatus as claimed in claim 1 wherein said mine roof bolting machine applying means includes a mechanism having a thrust cylinder and a linkage which move said thrust motor upward and wherein said calculating means comprises a computer and further wherein said controlling means comprises means for manually controlling the thrust of said thrust cylinder and means for automatically controlling the thrust of said thrust cylinder, and a computer program to switch between manual control for the thrust cylinder and automatic control for the thrust cylinder based on sensed parameters.

22. An apparatus as claimed in claim 1 including a reflector plate and housing to direct a beam upward from said ultrasonic transceiver while protecting the ultrasonic transceiver by locating it within a protective shield.

23. An apparatus as set forth in claim 1 including a load cell to directly measure an axial force on said elongated member.

24. An apparatus as set forth in claim 1 wherein said controlling means comprises means for measuring said upward thrust and means for making small, rapid, pressure adjustments in said applying means until the measured upward thrust is in agreement with the calculated maximum thrust to within an error corresponding to the force equivalent of the small incremental pressure adjustments.

* * * * *